(12) United States Patent
Nishimori et al.

(10) Patent No.: US 8,297,622 B2
(45) Date of Patent: Oct. 30, 2012

(54) IMAGE PROCESSING PROGRAM AND IMAGE PROCESSING APPARATUS

(75) Inventors: Keisuke Nishimori, Kyoto (JP); Hiroshi Umemiya, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 897 days.

(21) Appl. No.: 11/353,021

(22) Filed: Feb. 14, 2006

(65) Prior Publication Data
US 2006/0258445 A1 Nov. 16, 2006

(30) Foreign Application Priority Data
May 11, 2005 (JP) ................................. 2005-138966

(51) Int. Cl.
A63F 13/00 (2006.01)
(52) U.S. Cl. ........................................... 273/440; 463/1
(58) Field of Classification Search ............... 463/1, 37, 463/40, 41, 43; 273/440
See application file for complete search history.

(56) References Cited

U.S. PATENT DOCUMENTS

| | | | | |
|---|---|---|---|---|
| 6,142,870 A | * | 11/2000 | Wada et al. | 463/4 |
| 6,256,047 B1 | * | 7/2001 | Isobe et al. | 345/473 |
| 2001/0000779 A1 | * | 5/2001 | Hayama et al. | 463/30 |
| 2002/0072416 A1 | * | 6/2002 | Ohshima | 463/43 |
| 2002/0154214 A1 | * | 10/2002 | Scallie et al. | 348/51 |
| 2003/0058238 A1 | * | 3/2003 | Doak et al. | 345/419 |
| 2003/0207704 A1 | * | 11/2003 | Takahashi et al. | 463/1 |
| 2004/0023717 A1 | | 2/2004 | Tsuda et al. | |
| 2007/0072674 A1 | * | 3/2007 | Ohta et al. | 463/37 |

FOREIGN PATENT DOCUMENTS

| | | |
|---|---|---|
| GB | 2 395 645 | 5/2004 |
| JP | 11-226252 | 8/1999 |
| JP | 2001-006000 | 1/2001 |
| JP | 2001-43397 | 2/2001 |
| JP | 2002-253848 | 9/2002 |
| JP | 2004-062666 | 2/2004 |
| JP | 2004-216169 | 8/2004 |
| JP | 2005-100133 | 4/2005 |
| JP | 2002-216151 | 8/2010 |

OTHER PUBLICATIONS

"Goldeneye 007" game manual www.replacementdocs.com.*
Japanese Office Action dated Oct. 20, 2010 for JP Application No. 2005-138966.
Media Works Inc. "Dragon Quest Characters: Tomeko no Daiböken 2—Fushigi no Dungeon", Dengeki PlayStation, vol. 5, No. 20, p. 196-197 (Jul. 23, 1999). (Partial Translation).

(Continued)

*Primary Examiner* — David L Lewis
*Assistant Examiner* — Eric M Thomas
(74) *Attorney, Agent, or Firm* — Nixon & Vanderhye P.C.

(57) ABSTRACT

A game apparatus 3 moves an arrow object 72 in a virtual space, and then determines whether or not a hitting determination area 74 set for the arrow object 72 is in contact with a hitting determination area 73 set for a player character 71. When the two hitting determination areas 74, 73 are determined to be in contact with each other, the game apparatus 3 calculates a moving direction of the arrow object 72. The game apparatus 3 further causes the player character 71 to perform a motion such that at least a part of the player character 71 turns to a designated direction, which is an opposite direction to the moving direction of the arrow object 72. A display apparatus displays how the player character 71 performs the motion.

26 Claims, 13 Drawing Sheets

OTHER PUBLICATIONS

Media Works Inc. Kābï no Ea Raido (Kirby Air Ride), Dengeki Game Cube, vol. 3, No. 9, p. 60-63 (Aug. 1, 2003). (Partial Translation).

Notice of Reasons for Rejection issued Jan. 13, 2011 for corresponding JP Application No. 2005-138966.

* cited by examiner

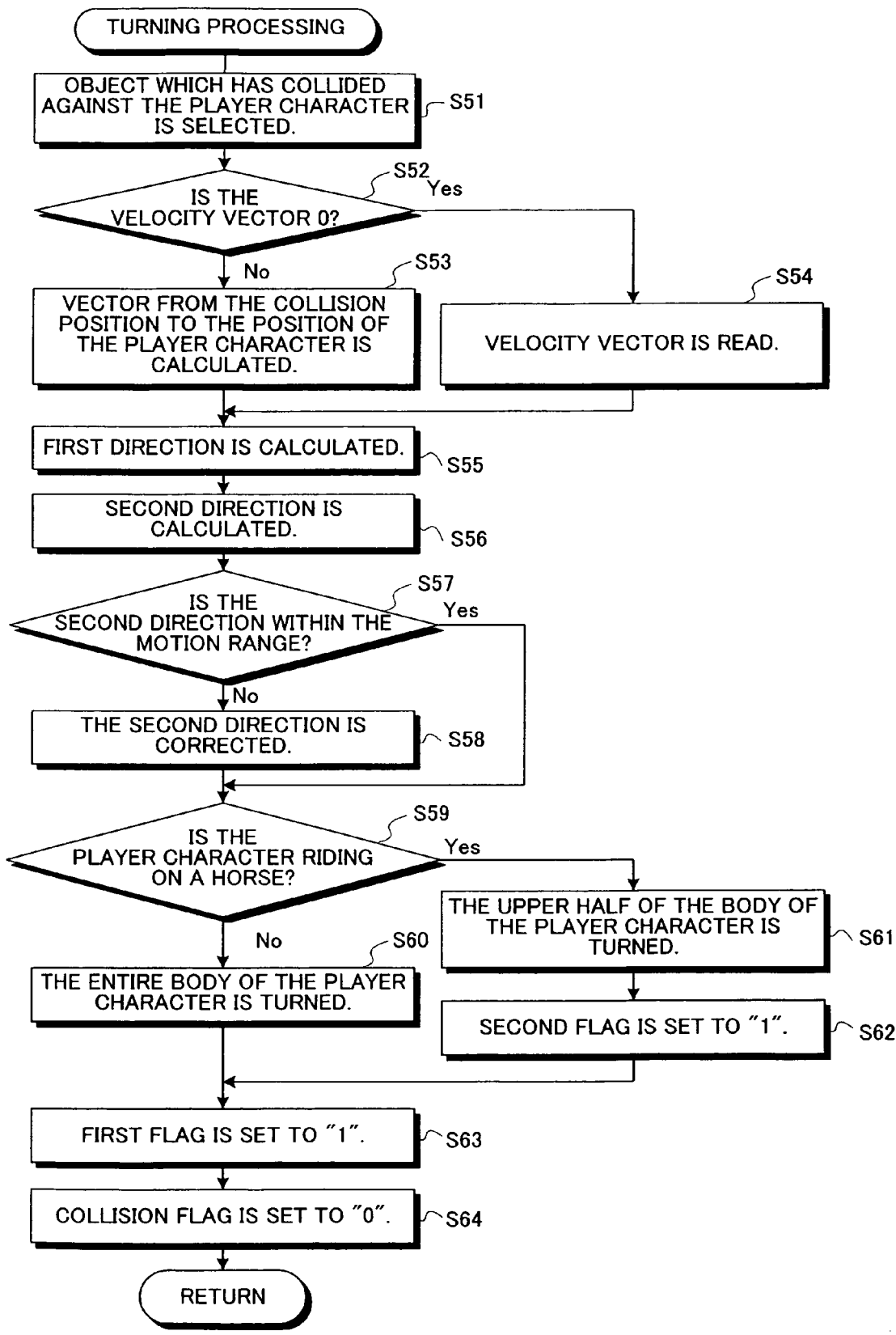

IMAGE PROCESSING PROGRAM AND IMAGE PROCESSING APPARATUS

CROSS REFERENCE OF RELATED APPLICATION

The disclosure of Japanese Patent Application No. 2005-138966 is incorporated herein by reference.

BACKGROUND OF THE INVENTION

1. Field of the Invention

The present invention relates to an image processing program and an image processing apparatus, and more specifically to an image processing program and an image processing apparatus for displaying an image representing two objects appearing in a three-dimensional virtual space colliding against each other.

2. Description of the Background Art

Conventionally in a technological field of constructing a virtual space in which objects (characters) appear, causing the objects to perform motions, and displaying a moving picture representing the motion of the objects, the motions of the objects are controlled to look realistic. For example, there is a video game apparatus for causing a player character operated by a player to perform naturally-looking motions (see, for example, Japanese Laid-Open Patent Publication No. 2002-253848). With this video game apparatus, a detectable object is located in a game space. In the case where the player character exists within a predetermined distance from the detectable object, the motion of the player character is controlled such that the player character performs a motion of turning its face toward the detectable object. This motion is performed regardless of whether or not the detectable object is displayed on the screen. Therefore, this motion allows the player to learn the existence of the object which is not displayed on the screen. In addition, the player character is caused to perform a naturally-looking motion of "noticing the existence of the object and turning toward the object", so that the motion of the player character can be represented more realistically.

Here, a case where the object collides against the player character will be described. In this case, in order to represent the motion of the player character realistically, the player character can be caused to perform a motion of turning toward the object which has collided against the player character.

According to the above-described conventional technology, when the player character comes within a predetermined distance from the detectable object, the player character performs a motion of turning toward the detectable object. However, the object may possibly collide against the player character from behind the player character. Alternatively, for example, the player character may possibly be attacked by an enemy character from behind. If the conventional technology is used for such cases, the player character performs a motion of turning back when an object approaches from behind. Namely, the player character performs a motion of turning in any direction toward an object approaching the player character (i.e., a motion of noticing any object approaching the player character), which is unrealistic and unnatural. As can be appreciated from the above, if the conventional technology is used when an object collides against the player character, the motion of the player character cannot represented realistically.

In the case where the player character is caused to perform a motion of turning toward an object approaching the player character, it should be determined whether or not the object and the player character have actually collided against each other. The above-described conventional technology, however, can only detect the distance between the object and the player character. Therefore, it cannot be accurately detected whether or not the object and the player character have actually collided against each other.

SUMMARY OF THE INVENTION

Therefore, an image processing program and an image processing apparatus has been developed for realistically representing motions of objects when the objects collide against each other.

The present invention has the following features to attain the object mentioned above. The reference numerals, additional explanations and the like in parentheses in this section of the specification indicate the correspondence with the embodiments described later for easier understanding of the present invention and do not limit the present invention in any way.

A computer-readable storage medium has been developed having an image processing program (game program) stored therein to be executed by a computer (CPU 31 or the like) of an image processing apparatus (game apparatus 3) for causing a display apparatus (TV 2) to display a three-dimensional virtual space in which a plurality of objects (player character, 71, enemy character, arrow object 72, and the like) appear. The image processing program causes the computer to execute a first moving control step (step S3), a determination step (steps S44 and S45), a direction calculation step (steps S54 through S56), a first motion control step (step S60 or S61), and a display step (step S12). In the first moving control step, the computer moves a first object (arrow object 72) in the virtual space. In the determination step, the computer determines whether or not the first object has collided against the second object (player character 71). In the direction calculation step, when it is determined in the determination step that the first object has collided against the second object, the computer calculates a moving direction (vector V1 or V2) of the first object. In the first motion control step, the computer causes the second object to perform a motion such that at least a part of the second object turns to a designated direction (first direction or second direction), which is an opposite direction to the moving direction of the first object. In the display step, the computer causes the display apparatus to display how the second object is caused to perform the motion by the first motion control step.

A computer-readable storage medium has been developed having an image processing program (game program) stored therein to be executed by a computer (CPU 31 or the like) of an image processing apparatus (game apparatus 3) for causing a display apparatus (TV 2) to display a three-dimensional virtual space in which a plurality of objects (player character, 71, enemy character, arrow object 72, and the like) appear. The image processing program causes the computer to execute a velocity vector storage step (step S3), a first moving control step (step S3), a determination step (steps S44 and S45), a velocity vector referring step (step S54), a first motion control step (step S60 or S61), and a display step (step S12). In the velocity vector storage step, the computer stores a velocity vector representing a moving direction and a moving distance per time unit of a first object in the virtual space. In the first moving control step, the computer updates a position of the first object in the virtual space based on the velocity vector and thus moving the first object. In the determination step, the computer determines whether or not the first object has collided against a second object. In the velocity vector referring step, when it is determined in the determination step that the first object has collided against the second object, the computer refers to the velocity vector of the first object. In the first motion control step, the computer causes the second object to perform a motion such that at least a part of the second object turns to a designated direction, which is an opposite direction to the velocity vector. In the display step, the computer causes the display apparatus to display how the second object is caused to perform the motion by the first motion control step.

A computer-readable storage medium has been developed having an image processing program (game program) stored therein to be executed by a computer (CPU 31 or the like) of an image processing apparatus (game apparatus 3) for causing a display apparatus (TV 2) to display a three-dimensional virtual space in which a plurality of objects (player character, 71, enemy character, arrow object 72, and the like) appear. The image processing program causes the computer to execute a deformation step (step S3), a determination step (steps S44 and S45), a position calculation step (steps S53, S55 and S56), a first motion control step (step S60 or S61), and a display step (step S12). In the deformation step, the computer deforms a hitting determination area (76) set for a first object (bomb object 75). In the determination step, the computer determines whether or not a hitting determination area (74) set for the first object is in contact with a hitting determination area (73) set for a second object (player character 71). In the position calculation step, when it is determined in the determination step that hitting determination areas are in contact with each other, the computer calculates a contact position of the hitting determination areas (point P shown in FIG. 8). In the first motion control step, the computer causes the second object to perform a motion such that at least a part of the second object turns to a designated direction, which is a direction from a position of the second object to the contact position. In the display step, the computer causes the display apparatus to display how the second object is caused to perform the motion by the first motion control step.

The image processing program may perform a predetermined motion (attack motion) which is different from a moving motion when a predetermined first condition is fulfilled. In this case, in the first motion control step, the part of the second object (the upper half of the body of the player character 71) is controlled to turn to the designated direction (see FIG. 14). The image processing program causes the computer to further execute a second motion control step. In the second motion control step, the computer causes the second object to perform the predetermined motion to the designated direction in accordance with the first condition being fulfilled.

The image processing program may perform an operation target object operable by a user (player character). In this case, the first condition is that the user has performed an operation on the second object. In the first motion control step, the motion of the second object is performed regardless of an operation performed by the user.

The image processing program may cause the computer to further execute a second moving control step. In the second moving control step, when the part of the second object turns to the designated direction, the computer moves the second object in a direction to which the remaining part of the second object is directed.

In the first motion control step, the part of the second object (the upper half of the body of the player character) may be controlled to turn to the designated direction (see FIG. 14). In this case, the image processing program causes the computer to further execute a third motion control step. In third motion control step, after the part of the second object turns to the designated direction, the computer causes the second object to return the part of the second object to an original direction in accordance with a predetermined second condition being fulfilled.

In the determination step, it may be determined whether or not the first object has collided against the second object based on whether or not a hitting determination area (74) set for the first object is in contact with a hitting determination area (73) set for the second object.

In the direction calculation step, a two-dimensional vector representing a component parallel to a predetermined plane in the virtual space (vector V1 shown in FIG. 5) may be calculated for a vector representing the moving direction of the first object (velocity vector). In this case, in the first motion control step, the computer causes the second object to perform a rotation motion around an axis perpendicular to the predetermined plane (y axis), with the designated direction being an opposite direction to the two-dimensional vector calculated in the direction calculation step.

In the first motion control step, a two-dimensional vector representing a component parallel to a predetermined plane in the virtual space (vector V3 shown in FIG. 9) may be calculated for a vector representing a direction from the contact position to a position of the second object. In this case, the computer causes the second object to perform a rotation motion around an axis perpendicular to the predetermined plane (y axis), with the designated direction being an opposite direction to the two-dimensional vector.

An image processing apparatus may have equivalent functions to the functions realized by executing the above-described image processing program.

The second object may perform a motion so as to turn to the direction from which the object has been moved. Thus, the motion of the second object when colliding against the first object can be represented realistically. Also according to the first aspect, the direction to which the second object turns is not determined based on the position at which the two objects have collided against each other but based on the moving direction of the first object. Thus, a more natural and realistic motion can be provided as compared to the case where the direction of the motion of the second object is determined based on the position at which the two objects have collided against each other.

The moving direction of the first object can be accurately calculated using the velocity vector. The velocity vector is calculated by the processing of moving the first object, and an opposition direction to the velocity vector is determined to be the designated direction. Therefore, according to the second aspect, the moving direction of the object can be easily calculated without performing a special calculation, for example, a calculation for obtaining a vector from the position of the second object to the contact position.

The second object may perform a motion so as to turn toward the contact position of the hitting determination area of the first object and the hitting determination area of the second object. Thus, the motion of the second object when colliding against the first object can be represented realistically. Also according to the third aspect, even if the first object does not move and thus the direction of the motion of the second object cannot be determined based on the moving direction of the first object, the behavior of the second object can be represented realistically.

The second object may perform a complicated and realistic motion of performing a predetermined motion when the second object turns to the designated direction.

To cause the second object to perform a predetermined motion to the designated direction, the user may not need to perform an operation to direct the second object to the designated direction and only needs to perform an operation to cause the second object to perform the predetermined motion. Thus, the operation of the user for causing the second object to perform a predetermined motion to the designated direction can be simplified.

The second object may move and perform a predetermined motion in different directions separately. Therefore, the second object can perform a more complicated and realistic motion.

The second object may automatically turn to the original state from the state in which only a part thereof is directed to the designated direction. The "state in which only a part of the second object is directed in the designated direction" is as follows. For example, where the second object is a human object, the upper half and the lower half of the body of the second object are directed in different directions (see FIG. 14). When such a state is continued indefinitely, this gives the player an unnatural impression and the motion of the second object is not natural or realistic. According to the seventh aspect, by contrast, the second object automatically returns to the original state from the state in which only a part thereof is directed to the designated direction. Therefore, the motion of the second object looks natural.

It may be determined easily whether or not two objects have collided against each other by using hitting determination areas. In the case where, for example, a spherical or cylindrical area is used as a hitting determination area, the determination on the collision can be processed at high speed. This can alleviate the processing load on the computer.

The motion of the second object may be realized by a simple rotation motion around one axis. Therefore, the processing for causing the second object to perform a motion is simplified. Namely, the processing load on the computer can be alleviated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a flowchart illustrating a detailed flow of step S8 shown in FIG. 16.

DESCRIPTION OF THE PREFERRED EMBODIMENTS

Figure 1:
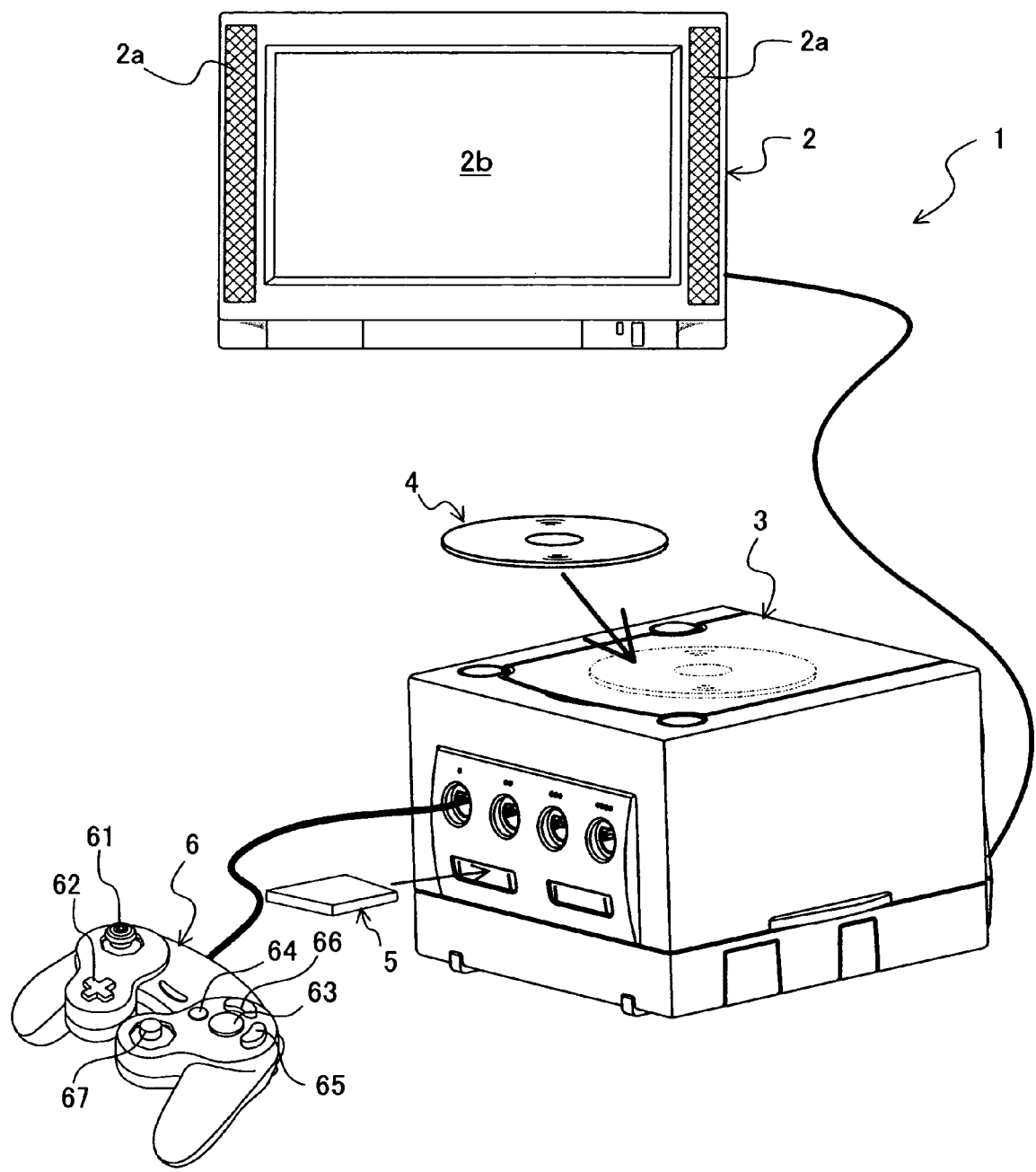
FIG. 1 is an external view of a game system including a game apparatus 3 according to one embodiment of the present invention.

Hereinafter, a game apparatus and a game program and a game system including such a game apparatus will be described. FIG. 1 is an external view of a game system 1. In this disclosed embodiment, an installation-type game apparatus will be described as an exemplary game apparatus. However, the game apparatus is not limited to this disclosed embodiment, and is applicable to devices having a computer for executing a game program (image processing program) mounted thereon, such as mobile game apparatuses, arcade game apparatuses, mobile terminals, cellular phones, personal computers, and the like.

In FIG. 1, the game system 1 includes an installation-type game apparatus (hereinafter, referred to simply as a "game apparatus") 3, and a TV receiver (hereinafter, referred to simply as a "TV") 2 as an exemplary display apparatus connected to the game apparatus 3 via a connection cord. The game apparatus 3 is connected to a controller 6 having a plurality of switches operable by a player. On the game apparatus 3, an optical disc 4 is detachably mounted as an exemplary information storage medium having a game program stored therein. Also on the game apparatus 3, a cartridge 5 having a flash memory or the like for storing saved data of the game or the like is detachably mounted when necessary. The game apparatus 3 displays, on the TV 2, a game image obtained by executing a game program stored in the optical disc 4. The game apparatus 3 can also resume the game executed in the past or reproduce a game state executed in the past, using the saved data stored in the cartridge 5, and display the game image on the TV 2. The player of the game apparatus 3 can enjoy the game by operating the controller 6 while watching the game image displayed on the TV 2.

The controller 6 is detachably connected to the game apparatus 3 via the connection cord as described above. The controller 6 is operation means mainly for performing an operation on a player object (an object which is an operation target of the player (character)) appearing in a game space displayed on the TV 2. The controller 6 includes an input section having operation buttons, keys, sticks and the like as a plurality of operation switches. Specifically, the controller 6 includes a grip section to be held by the player. The controller 6 includes a main stick 61 and a cross-shaped key 62 which are operable by the thumb or the like of the left hand of the player, and a C stick 67, an A button 63 and the like which are operable by the thumb or the like of the right hand of the player. The controller 6 also includes a B button 64, an X button 65, a Y button 66, and a start/pause button. The controller 6 further includes an R button and a Z button which are operable by the index finger or the like of the right hand of the player, and an L button operable by the index finger or the like of the left hand of the player. The game system 1, in the case where a plurality of controllers 6 are connected to the game apparatus 3, allows a plurality of players to play the game at the same time.

Figure 2:
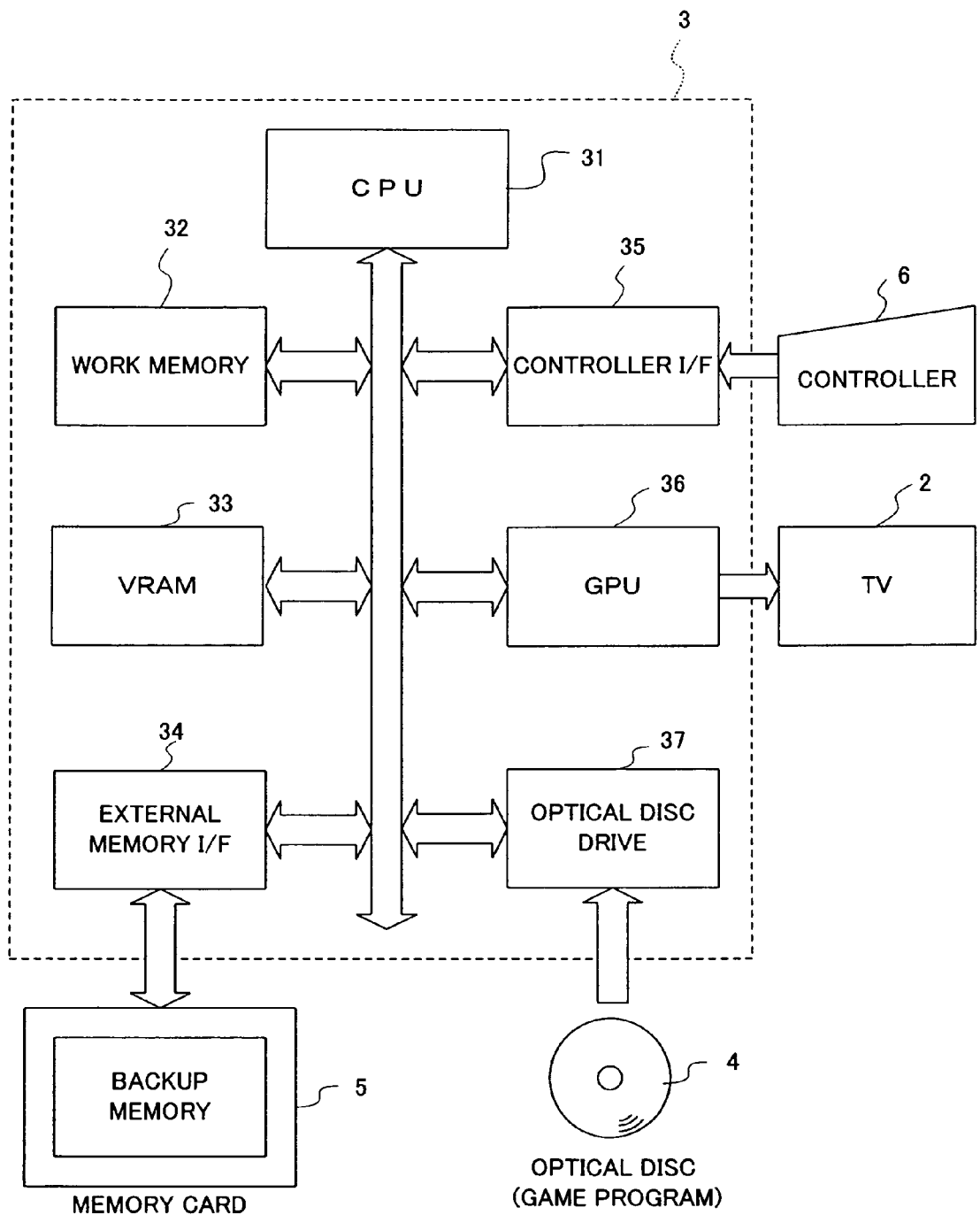
FIG. 2 is a functional block diagram of the game system.

Next, with reference to FIG. 2, a structure of the game apparatus 3 will be described. FIG. 2 is a functional block diagram of the game system 1. In FIG. 2, the game apparatus 3 includes a CPU (central processing unit) 31 for executing various types of programs. The CPU 31 executes a start program stored in a boot ROM (not shown) to, for example, initialize a work memory 32 and other memories. Then, the CPU 31 reads a game program stored in the optical disc 4 into the work memory 32, and after that, executes the game program to perform game processing in accordance with the game program. The CPU 31 is connected to the work memory 32, a video RAM (VRAM) 33, an external memory interface (I/F) 34, a controller interface (I/F) 35, a GPU (Graphics Processing Unit) 36, and an optical disc drive 37 via a bus.

The work memory 32 is a storage area used by the CPU 31, and appropriately stores a game program and the like required for the processing performed by the CPU 31. For example, the work memory 32 stores a game program, various types of data and the like read from the optical disc 4 by the CPU 31. The game program, various types of data and the like stored in the work memory 32 are executed by the CPU 31. The VRAM 33 stores game image data for displaying game images on the TV 2. The external memory I/F 34 engages the cartridge 5 with a connector (not shown) to communicably connect the game apparatus 3 and the cartridge 5 to each other. The CPU 31 accesses a backup memory provided in the cartridge 5 via the external memory I/F 34. The controller I/F 35 communicably connects an external device and the game apparatus 3 to each other via a connector (not shown). For example, the controller 6 is engaged with the connector via a connection cord and is connected to the game apparatus 3 via the controller I/F 35. In accordance with the operation by the player on the main stick 61 and the C stick 67 and the pressing operation by the player on the operation buttons 62 through 66 and the like, the controller 6 outputs operation data indicating the operation contents to the game apparatus 3. The GPU 36 is formed of, for example, a semiconductor chip for performing processing including vector operations and rendering processing which are necessary for 3D graphics display in accordance with instructions from the CPU 31. A game image rendered by the GPU 36 is displayed on the TV 2. The optical disc drive 37 reads various types of data including the game program, image data and sound data stored in the optical disc 4 in accordance with instructions from the CPU 31.

Hereinafter, game processing executed by the game apparatus 3 by the game program stored in the optical disc 4 will be described. First, an overview of a game according to this embodiment will be described. This game is an action game in which a player character operable by the player (operation target object) and an enemy character, a motion of which is controlled by the game apparatus 3, appear in a three-dimensional virtual space. The player character and the enemy character attack each other using weapons such as swords, arrows and the like. When attacked by the enemy character, the stamina of the player character is decreased. When the stamina becomes zero, the game is over. The purpose of this game is to defeat the enemy character by operating the player character.

In this embodiment, the game apparatus 3 controls a motion of the player character so as to realistically represent the motion of the player character when player character is attacked. Specifically, the player character, when attacked, is controlled to turn to the direction in which the attack has come. This motion is performed regardless of the operation provided by the player. Namely, without the player operating to change the direction of the player character, the game apparatus 3 controls a motion of the player character such that the player character turns to the enemy character. Hereinafter, with reference to FIG. 3 through FIG. 7, such a control will be described regarding an exemplary case in which the player character is hit by an arrow. In the following description of the embodiment, among the objects appearing in the game space, an object operated by the player will be referred to as a "player character", in order to distinguish the player character from the other objects (for example, an arrow character and the like described later). The simple term "object" will refer to an object other than the player character.

Figure 3:
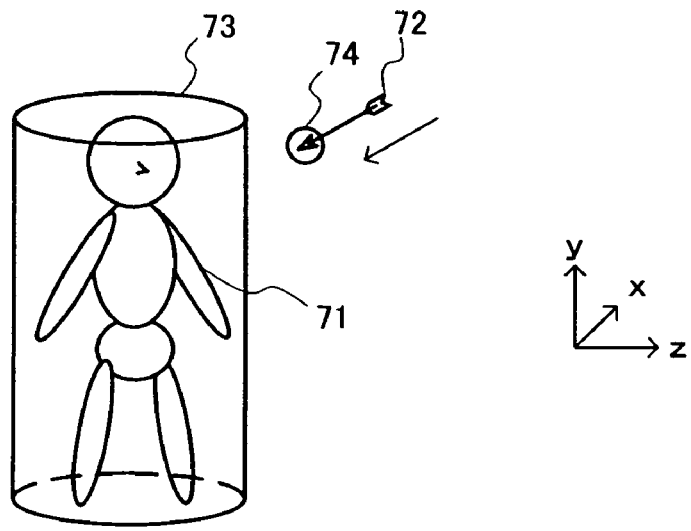
FIG. 3 shows a game space immediately before a player character is hit by an arrow.

FIG. 3 shows the game space immediately before the player character is hit by an arrow (arrow object). Hereinafter, a coordinate system having an x-z plane which is parallel to the ground will be used as a world coordinate system for representing positions in the game space. In FIG. 3, an arrow object 72 flies (moves) toward a player character 71. For the player character 71, a cylindrical hitting determination area 73 is set. The central axis of the cylindrical hitting determination area 73 passes through the position of the player character 71 parallel to a y axis of the coordinate system, and the hitting determination area 73 substantially accommodates the player character 71 therein. For the arrow object 72, a spherical hitting determination area 74 is set at the arrow head thereof. The hitting determination areas 73 and 74 are virtually set in the game space and are not displayed on the game screen. The hitting determination areas set for the player character 72 and the arrow object 72 may be of any shape. For example, the hitting determination area for the player character 71 may be spherical. A hitting determination area including a plurality of three-dimensional bodies may be set for one character. For example, one hitting determination area may be set for each of the hand, leg, head and the like of the player character.

The game apparatus 3 determines whether or not the player character 71 and the arrow object 72 are in contact with each other based on whether or not the two hitting determination area 73 and 74 are in contact with each other. When it is determined that the player character 71 and the arrow object 72 are in contact with each other, the game apparatus 3 causes the player character 71 to perform a motion of turning to the arrow object 72 (turning motion). In this embodiment, a turning motion is a combination of a rotation motion performed around the y axis (first rotation motion) and a rotation motion performed around an axis perpendicular to the y axis (second rotation motion). Hereinafter, the first rotation motion and the second rotation motion will be described.

Figure 4:
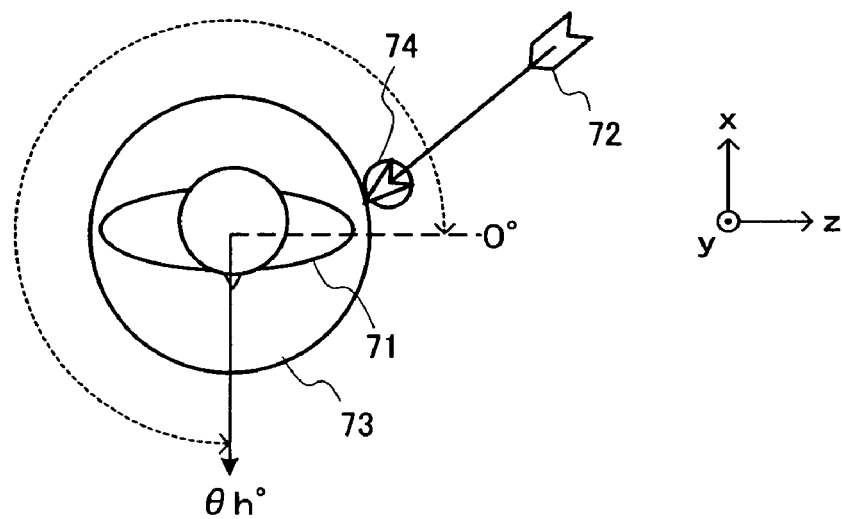
FIG. 4 shows the game space when the player character is hit by the arrow.
Figure 5:
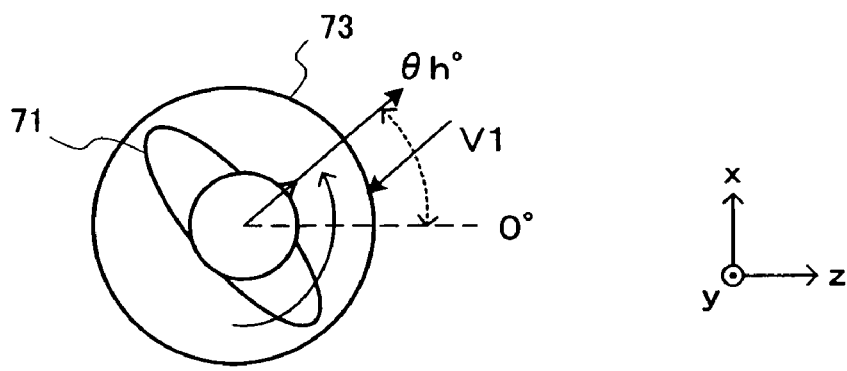
FIG. 5 shows the player character after performing a turning motion from the state shown in FIG. 4.

With reference to FIG. 4 and FIG. 5, the first rotation motion will be described. FIG. 4 shows the game space when the player character 71 is hit by the arrow object 72. In FIG. 4, the three-dimensional game space is seen from above (from the positive side on the y axis). In this embodiment, the direction of the player character 71 with respect to the x-z plane, i.e., the direction of the player character 71 regarding the first rotation motion, is represented based on a predetermined direction parallel to the x-z plane which is defined in the world coordinate system (the predetermined direction will be referred to as a "first reference direction"). In FIG. 4, the first reference direction is the positive direction on the z axis. The direction of the player character 71 for the first rotation motion performed around the y axis is represented by an angle θh, which is made by the first reference direction and a direction in which the player character 71 is currently directed.

As shown in FIG. 4, when the arrow object 72 contacts the player character 71, the game apparatus 3 calculates a direction in which the player character 71 is to turn for performing the first rotation motion (first direction). The first direction is calculated based on a velocity vector of the arrow object 72. The "velocity vector" of the arrow object 72 is a three-dimensional vector which represents a movement (moving direction and moving amount) per time unit (e.g., per frame) of the arrow object 72. A velocity vector of each object is calculated, for example, frame by frame, in accordance with a predetermined algorithm in consideration of physical calculations or the like. Specifically, the first direction is an opposite direction to a two-dimensional vector (vector V1 shown in FIG. 5) having an x component and a z component of the velocity vector. FIG. 5 shows the player character 71 after performing a turning motion from the state shown in FIG. 4. The game apparatus 3 causes the player character 71 to perform the first rotation motion to turn to the calculated first direction. As shown in FIG. 5, the player character 71 performs a motion of turning its entire body to the calculated first direction as the first rotation motion.

Figure 6:
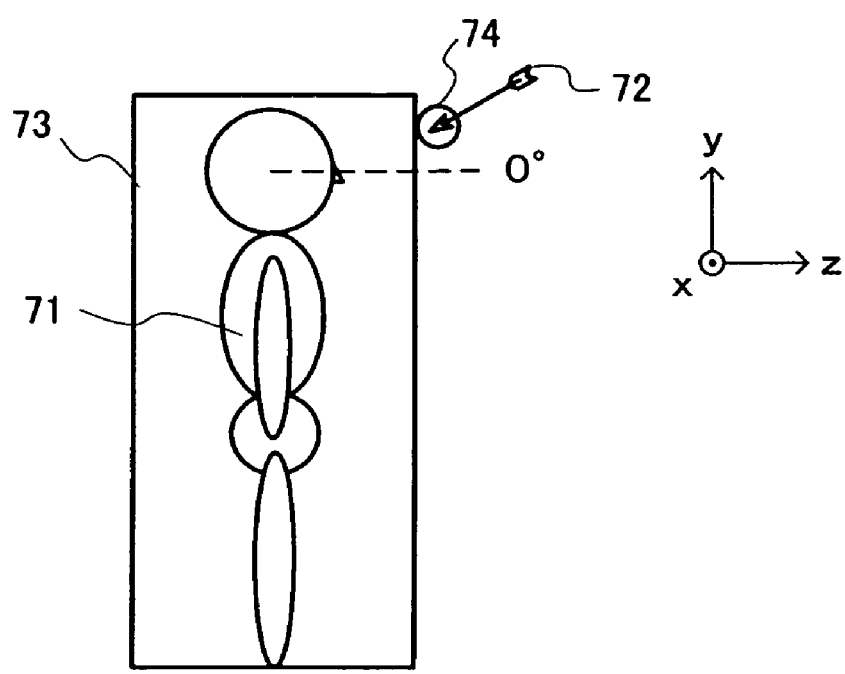
FIG. 6 shows the game space when the player character is hit by the arrow.

Next, with reference to FIG. 6 and FIG. 7, the second rotation motion will be described. FIG. 6 shows the game space when the player character 71 is hit by the arrow object 72. In FIG. 6, the three-dimensional game space is seen from the positive side on the x axis. In this embodiment, the direction of the player character 71 regarding the rotation motion performed around an axis perpendicular to the y axis (regarding the second rotation motion) is represented based on a predetermined direction parallel to the x-z plane (the predetermined direction will be referred to as a "second reference direction"). The direction of the player character 71 regarding the second rotation motion performed around an axis perpendicular to the y axis is represented by an angle θv, which is made by the second reference direction and a direction in which the player character 71 is currently directed.

Figure 7:
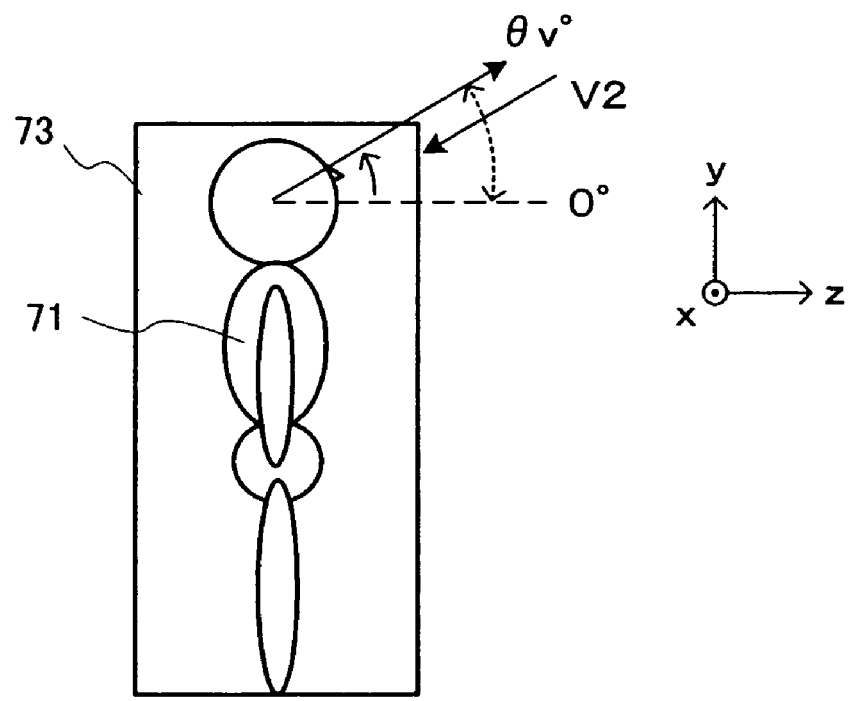
FIG. 7 shows the player character after performing a turning motion from the state shown in FIG. 6.

FIG. 7 shows the player character 71 after performing the turning motion from the state shown in FIG. 6. When the arrow object 72 contacts the player character 71, the game apparatus 3 calculates a direction in which the player character 71 is to turn for performing the second rotation motion (second direction). The second direction is calculated based on the above-mentioned velocity vector of the arrow object 72. Specifically, the second direction is an opposite direction to a two-dimensional vector (vector V2 shown in FIG. 7) having a y component of the velocity vector and a component of the velocity vector regarding the first direction. In FIG. 7, the direction in which the player character is directed as a result of performing the turning motion, i.e., the first direction is assumed to be the positive direction on the z axis. Therefore, vector V2 is a two-dimensional vector having the y component and the z component of the velocity vector. The game apparatus 3 causes the player character 71 to perform the second rotation motion to turn to the calculated second direction as shown in FIG. 7. Namely, the player character 71 performs a motion of turning its head to the calculated second direction as the second rotation motion.

In this embodiment, when the arrow object 72 or any other object moves and as a result contacts the player character 71, the player character 71 performs the turning motion in a manner described above with reference to in FIG. 3 through FIG. 7. Also when the player character 71 moves and as a result contacts any object which stays still, the player character 71 performs the turning motion in a manner described above with reference to in FIG. 3 through FIG. 7.

As described above, according to this embodiment, the motion of the player character when contacting an object can be represented realistically. In this embodiment, the direction to which the player character turns (the first direction and the second direction) is opposite to the velocity vector of the object. Such a setting is provided in order to more realistically represent the motion of the player character when an object which has been moving collides against the player character. The first direction and the second direction may be determined based on a position at which the object and the player character contact each other. Specifically according to this method, a direction from the position of the player character (e.g., the central position of the player character) to the contact position is set as the first direction and the second direction. With this method, however, the direction to which the player character turns may possibly be unnatural with respect to the direction in which the object has been moving. For example, referring to FIG. 4, if the first direction is the direction from the central position of the player character 71 toward the contact position, the first direction does not match the direction in which the arrow object 72 flies. As a result, the player may feel that the direction to which the player character 71 turns is unnatural. By contrast, according to this embodiment, the first direction matches the direction in which the arrow object 72 flies. Therefore, the above-described unnaturalness does not occur.

Next, a case where an object is determined to be in contact with the player character by a hitting determination area of the object being deformed will be described. In this embodiment, in addition to when an object moves and as a result collides against the player character, an object is determined to be in contact with the player character when a hitting determination area of the object is deformed. In this case, the object is, for example, a bomb object. The position of the object does not change, but the hitting determination area of the object is deformed. Hereinafter, an object which moves in the game space and as a result collides against the player character, such as an arrow object, will be referred to as a "moving object". An object, the hitting determination area of which is deformed and as a result is determined to have collided against the player character, such as a bomb object, will be referred to as an "area deforming object".

The hitting determination area of an area deforming object is deformed when some condition is fulfilled. As a result, the area deforming object may possibly be determined to be in contact with the player character. In this embodiment, when the object is determined to have collided against the player character as a result of the hitting determination area being deformed, the player character performs a turning motion, like the object moves and as a result collides against the player character. Hereinafter, with reference to FIG. 8 through FIG. 12, an exemplary case where the player character is attacked by a bomb will be described.

Figure 8:
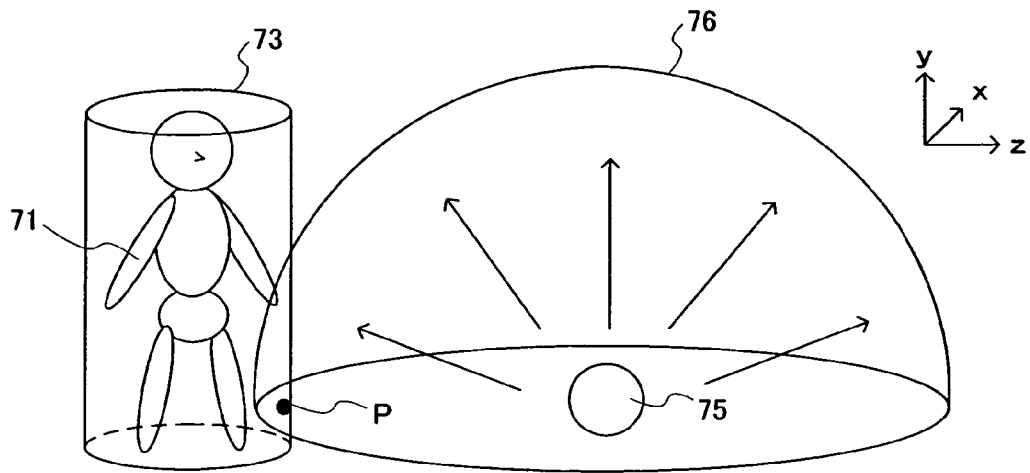
FIG. 8 shows the game space when the player character is attacked by a bomb.

FIG. 8 shows the game space when the player character 71 is attacked by a bomb. A bomb object 75 explodes, namely, a hitting determination area 76 of the bomb object 75 expands, by some condition being fulfilled (for example, a predetermined time having passed). In this example, the hitting determination area 76 has a spherical shape having the bomb object 75 at the center. By the explosion of the bomb object 75, the hitting determination area 76 is deformed such that a radius thereof increases. The expansion of the hitting determination area 76 is stopped when a predetermined time has passed after the explosion, and the hitting determination area 76 disappears (i.e., the hitting determination area 76 is not located in the game space). The bomb object 75 may be erased when the bomb object 75 explodes, or an object representing light or blast generated by the explosion may be displayed. In this case, the hitting determination area 76 may be considered as a hitting determination area of a blast object.

The game apparatus 3 determines whether or not the player character 71 is influenced by the explosion based on whether or not the two hitting determination area 73 and 76 are in contact with each other. When it is determined that the hitting determination area 73 and 76 are in contact with each other, the game apparatus 3 causes the player character 71 to perform a turning motion of turning to the explosion. The turning motion performed in the case of the explosion is a combination of a first rotation motion performed around the y axis and a second rotation motion performed around an axis perpendicular to the y axis, like in the case where the player character 71 is hit by the arrow object 72.

Figure 9:
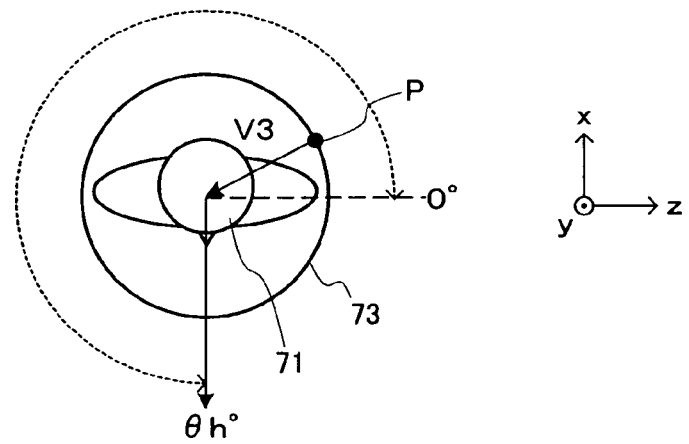
FIG. 9 shows the game space when the player character is influenced by an explosion.
Figure 10:
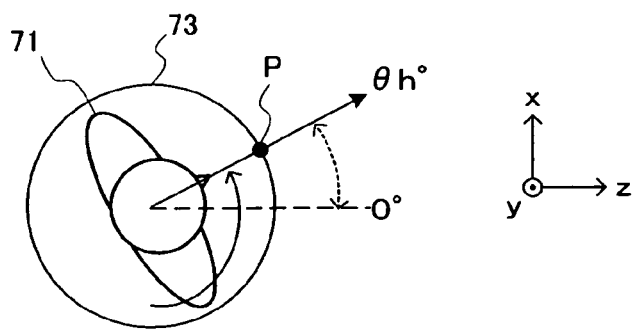
FIG. 10 shows the player character after performing a turning motion from the state shown in FIG. 9.

With reference to FIG. 9 and FIG. 10, the first rotation motion will be described. FIG. 9 shows the game space when the player character 71 is influenced by the explosion. In FIG. 9, the three-dimensional game space is seen from above (from the positive side on the y axis). As described above, the direction of the player character 71 regarding the first rotation motion performed around the y axis is represented by an angle $\theta h$, which is made by the first reference direction and a direction in which the player character 71 is currently directed.

When the hitting determination area 76 expands and as a result contacts the hitting determination area 73 of the player character 71, the game apparatus 3 calculates the first direction described above. In this case, the first and second directions cannot be calculated based on the velocity vector of the bomb object 75. Therefore, the first direction is calculated based on a contact position of the two hitting determination areas 73 and 76 (point P). Specifically, the game apparatus 3 calculates a vector starting at the contact position and terminating at the position of the player character 71 (e.g., the central position of the player character 71), and uses the resultant vector as the velocity vector. Namely, the first direction is an opposite direction to a two-dimensional vector (vector V3 shown in FIG. 9) having an x component and a z component of the velocity vector. FIG. 10 shows the player character 71 after performing a turning motion from the state shown in FIG. 9. The game apparatus 3 causes the player character 71 to perform the first rotation motion to turn to the calculated first direction. As shown in FIG. 10, the player character 71 performs a motion of turning its entire body to the calculated first direction as the first rotation motion.

Figure 11:
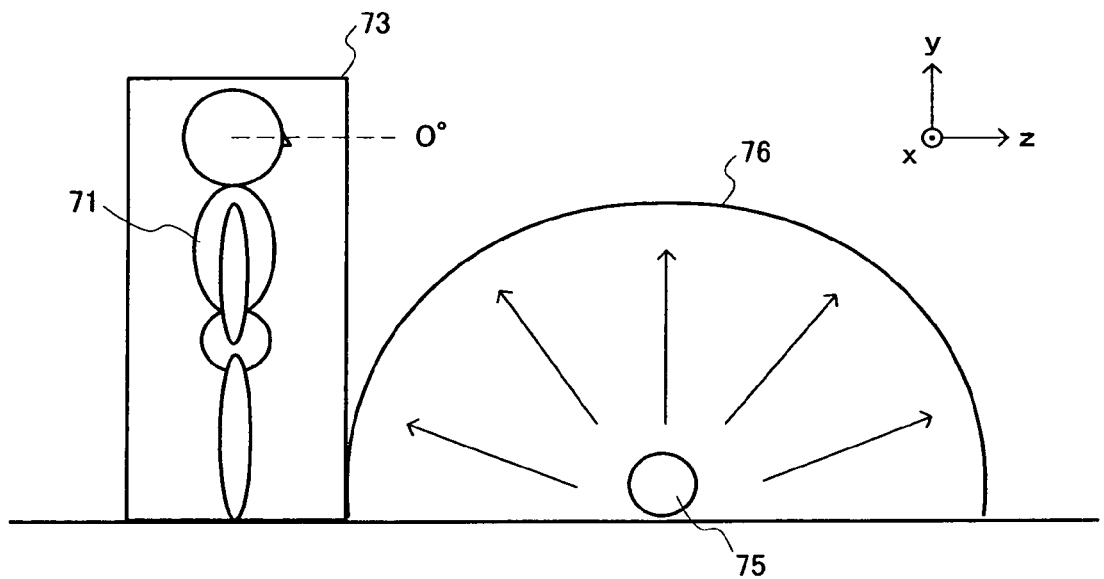
FIG. 11 shows the game space when the player character is influenced by the explosion.

Next, with reference to FIG. 11 and FIG. 12, the second rotation motion will be described. FIG. 11 shows the game space when the player character 71 is influenced by the explosion. In FIG. 11, the three-dimensional game space is seen from the positive side on the x axis. As described above, the direction of the player character 71 regarding the second rotation motion performed around an axis perpendicular to the y axis is represented by an angle $\theta v$, which is made by the second reference direction and a direction in which the player character 71 is currently directed.

Figure 12:
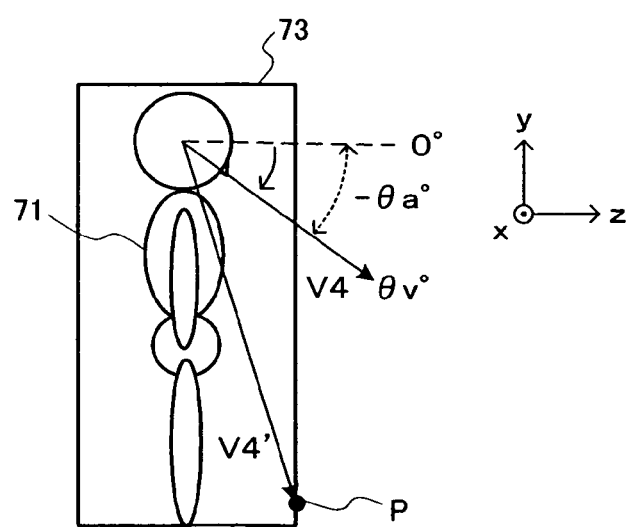
FIG. 12 shows the player character after performing a turning motion from the state shown in FIG. 11.

FIG. 12 shows the player character 71 after performing the turning motion from the state shown in FIG. 11. When the hitting determination area 76 expands and as a result contacts the hitting determination area 73 of the player character 71, the game apparatus 3 calculates the second direction described above. In this case, the second direction is calculated based on the contact position of the two hitting determination areas 73 and 76 (point P), like the first direction. Specifically, the game apparatus 3 calculates a vector starting at the contact position and terminating at the position of the player character 71, and uses the resultant vector as the velocity vector. The second direction is an opposite direction to a two-dimensional vector (vector V4' shown in FIG. 12) having a y component of the velocity vector and a component of the velocity vector regarding the first direction.

For the second rotation motion, an area in which the player character 71 can perform a motion (motion area) is set in advance. The game apparatus 3 causes the player character 71 to perform the second rotation motion within the motion area. The reason why the motion area is set is that it is unnatural for the player character 71 to turn its head to the direction of, for example, 180 degrees from the second reference direction. In this example, the motion area is $-\theta a° \leq \theta v \leq \theta a°$, where $\theta v$ is the angle made by the second reference direction and a second direction to which the player character 71 can naturally turn. In the example shown in FIG. 11 and FIG. 12, the angle made by the second reference direction and the vector V4' representing the calculated second direction is below $-\theta a°$, which is the lower limit of the motion area. Therefore, the game apparatus 3 corrects the second direction calculated based on the contact position and sets the direction of $-\theta a°$ as the second direction. As shown in FIG. 12, the player character 71 performs a motion of turning its head to the direction of $-\theta a°$ as the second rotation motion.

The size of the motion area is the same for an area deforming object and for a moving object. Accordingly, even in the case where the arrow object 72 contacts the player character 71, the second direction may be corrected as described above with reference to FIG. 11 and FIG. 12.

As described above, according to this embodiment, even if the velocity vector cannot be calculated, the motion of the player character 71 when contacting the object can be represented realistically.

Figure 13:
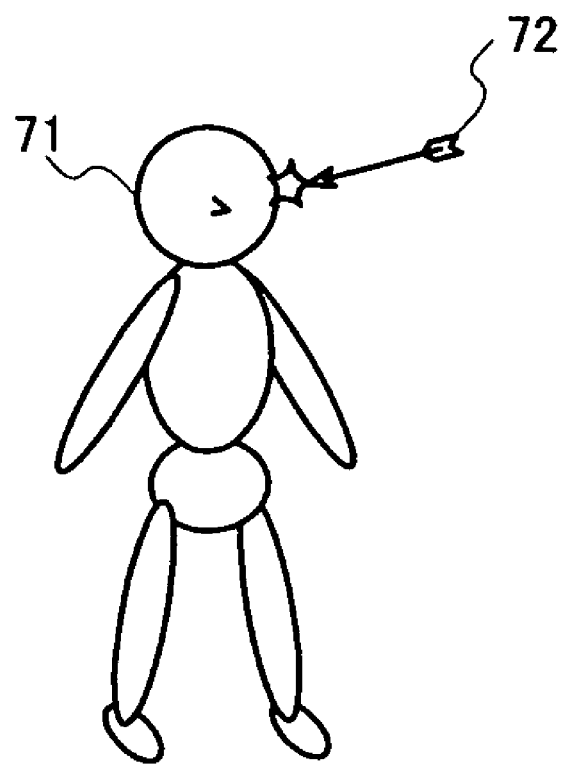
FIG. 13 shows a motion of the player character of turning the upper half of its body to a first direction.
Figure 14:
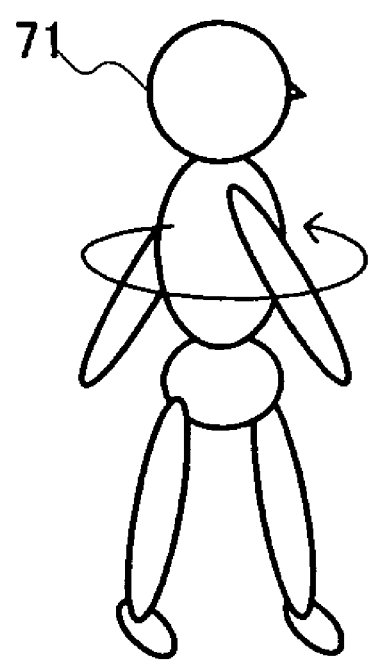
FIG. 14 shows a motion of the player character of turning the upper half of its body to the first direction.

In the above description, when performing the first rotation motion, the player character 71 turns its entire body to the first direction. Alternatively, the player character 71 may turn a part thereof. For example, the player character 71 may turn only the upper half of its body. FIG. 13 and FIG. 14 show a motion of the player character 71 of turning the upper half of its body to the first direction. When the arrow object 72 flying from the left of the player character 71 hits the player character 71 (FIG. 13), the game apparatus 3 may cause the player character 71 to perform a motion of turning the upper half of its body leftward (FIG. 14). In this case, the motion area may be set for the first direction as well as for the second direction.

In this embodiment, the player character 71 can move in the game space while riding on a horse as well as while walking. Namely, the player character 71 may assume either one of two states of standing or riding on a horse. In this embodiment, the player character 71 performs a motion of turning its entire body as the first rotation motion when in the state of standing, and performs a motion of rotating the upper half of its body as the first rotation motion when in the state of riding on a horse. Namely, when a turning motion is performed while the player character 71 is riding on a horse, the direction of only the upper half of the player character 71 is changed while the direction of the horse is not changed.

In this embodiment, the player character 71 can attack an enemy character both in the state of standing and in the state of riding on a horse. Here, the player character 71 can attack an enemy character with arrows. When the player character 71 performs a turning motion while riding on a horse, the player character 71 can attack in the direction in which the upper half of its body is directed after performing the turning motion. In this case, the direction in which the player character 71 shoots arrows is changed while the direction in which the horse advances is not changed. Namely, the moving direction and the attacking direction are different from each other. In the case where the player character 71 is riding on a horse, when a predetermined time passes after the turning motion, the player character 71 performs a motion of returning to the state before the turning motion (referred to as a "recovery motion"). Namely, the player character 71 performs a motion of turning the upper half of its body to the direction in which the horse is advancing.

In this embodiment, the player character performs a turning motion regardless of the operation provided by the player. After performing a turning motion, the player character can attack an enemy character. Accordingly, when the player character is attacked, the player can counterattack to the direction of the attack only by performing an attack operation, with no need of turning the player character to the direction of the attack. As described above, this embodiment provides an advantage that the operation of counterattacking after the player character is attacked is made easier to the player.

Figure 15:
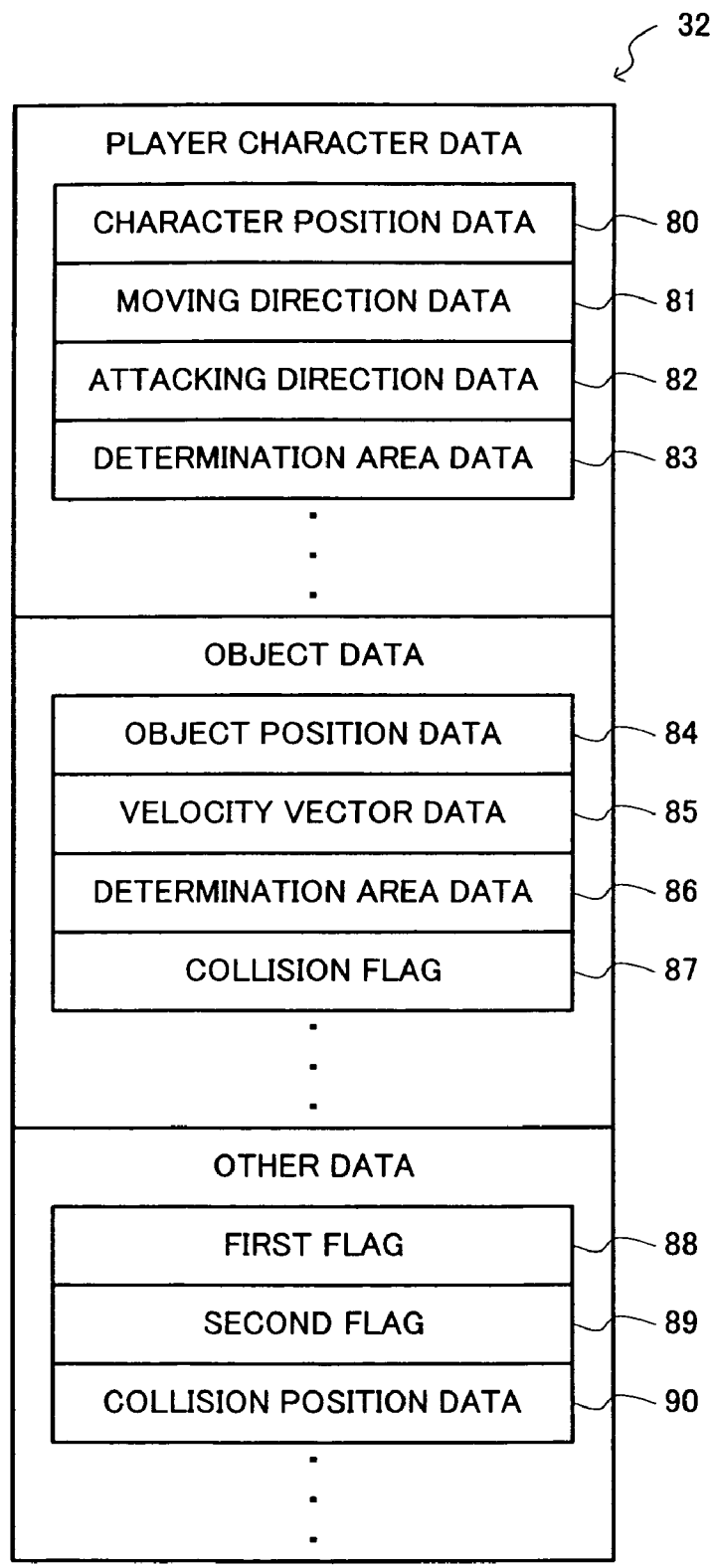
FIG. 15 shows main data stored in a work memory 32 of the game apparatus 3.

Next, the game processing performed by the game apparatus 3 by execution of the game program will be described in detail. First, with reference to FIG. 15, main data used in the game processing will be described. FIG. 15 shows main data stored in the work memory 32 of the game apparatus 3. As shown in FIG. 15, the work memory 32 has stored therein character position data 80, moving direction data 81, attacking direction data 82, determination area data 83 and the like as player character data. The work memory 32 also has stored therein object position data 84, velocity vector data 85, determination area data 86, a collision flag 87 and the like as object data. The work memory 32 further has stored therein a first flag 88, a second flag 89, collision position data 90 and the like as other data used for the game processing.

The player character data represents various parameters which are set regarding the player character. The player character data includes the character position data 80, the moving direction data 81, the attacking direction data 82, and the determination area data 83. The character position data 80 represents a position of the player character in the game space. As the character position data 80, data on a coordinate position represented by the world coordinate system is stored.

The moving direction data 81 represents a direction in which the player character moves. As the moving direction data 81, data on an angle represented in the range of 0° to 360° with respect to the first reference direction is stored (see FIG. 9). The direction represented by the moving direction data 81 is not a direction in which the player character is actually moving, but is a direction in which the player character can move. The moving direction data 81 represents a direction of the player character while the player character is standing, and represents a direction of the horse while the player character is riding on a horse.

The attacking direction data 82 represents a direction in which the player character attacks. As the attacking direction data 82, data on an angle represented in the range of 0° to 360° with respect to the first reference direction is stored, like the moving direction data 81. The attacking direction data 82 represents a direction of the player character (the same direction as represented by the moving direction data 81) while the player character is standing, and represents a direction of the upper half of the body of the player character while the player character is riding on a horse.

The determination area data 83 represents a hitting determination area which is set for the player character. In this embodiment, the hitting determination area of the player character is a cylindrical area having the position of the player character at the center (see FIG. 3). Accordingly, as the determination area data 83, data representing a radius of the cylinder and data representing a height of the cylinder are stored in the work memory 32.

In addition to the data shown in FIG. 15, the player character data includes data representing a moving amount per frame while the player character is actually moving, data representing a stamina value and an ability value of the player character, and the like. Although not shown in FIG. 15, substantially the same data regarding each enemy character appearing in the game space is stored in the work memory 32.

The object data represents various parameters which are set regarding an object such as an arrow, a bomb or the like. The object data includes the object position data 84, the velocity vector data 85, the determination area data 86, and the collision flag 87. The object position data 84 represents a position of the object in the game space. As the object position data 84, data on a coordinate position represented by the world coordinate system is stored like the character position data 80. The velocity vector data 85 represents a three-dimensional vector representing a moving direction and a moving amount of the object per frame (velocity vector). The velocity vector is specifically calculated by, for example, the following method. When the position of the object is updated frame by frame, the position of the object in the immediately previous frame and the current position of the object are stored in the work memory 32. A vector starting at the position of the object in the immediately previous frame and terminating at the current position of the object is obtained as the velocity vector.

The determination area data 86 represents a hitting determination area which is set for the object. In this embodiment, the hitting determination area of the object is a spherical area having the position of the object at the center (see FIG. 3). Accordingly, as the determination area data 86, data representing a radius of the sphere is stored in the work memory 32. FIG. 15 shows only one piece of object data, but object data is stored in the work memory 32 for each object.

The collision flag 87 represents whether or not the object has collided against the player character. When the object has collided against the player character, the collision flag 87 is set to "1", whereas when the object has not collided against the player character, the collision flag 87 is set to "0".

The first flag 88 represents whether or not the player character is performing a turning motion. In this embodiment, a turning motion and a recovery motion are performed over a plurality of frames. When the player character is performing a turning motion, the first flag 88 is set to "1", whereas when the player character is not performing a turning motion, the first flag 88 is set to "0".

The second flag 89 represents whether or not the moving direction and the attacking direction of the player character are different from each other. When the player character performs a turning motion while riding on a horse, the moving direction (the direction of the horse) and the attacking direction (the direction of the upper half of the body of the player character) are different from each other. The second flag 89 represents whether or not the direction of the horse and the direction of the upper half of the body of the player character are different from each other. When the moving direction and the attacking direction are different from each other, the second flag 89 is set to "1", whereas when the moving direction and the attacking direction are the same, the second flag 89 is set to "0".

The collision position data 90 represents a position at which the player character and the object have collided against each other. Specifically, the collision position data 90 represents a position at which the hitting determination area of the player character and the hitting determination area of the object contact each other. There are two cases where the hitting determination area of the player character and the hitting determination area of the object contact each other. In one case, the two hitting determination areas contact each other. In the other case, one hitting determination area digs into the other hitting determination area. When one hitting determination area digs into the other hitting determination area, the contact position can be calculated as follows, for example. Where the radius of the bottom surface of the cylindrical hitting determination area of the player character is r1 and the radius of the spherical hitting determination area of the object is r2, the contact position is a position at which the line segment connecting the position of the player character and the position of the object is divided at a ratio of r1:r2. For calculating the contact position, any method based on the hitting determination area set for the player character and the hitting determination area set for the object is usable.

Figure 16:
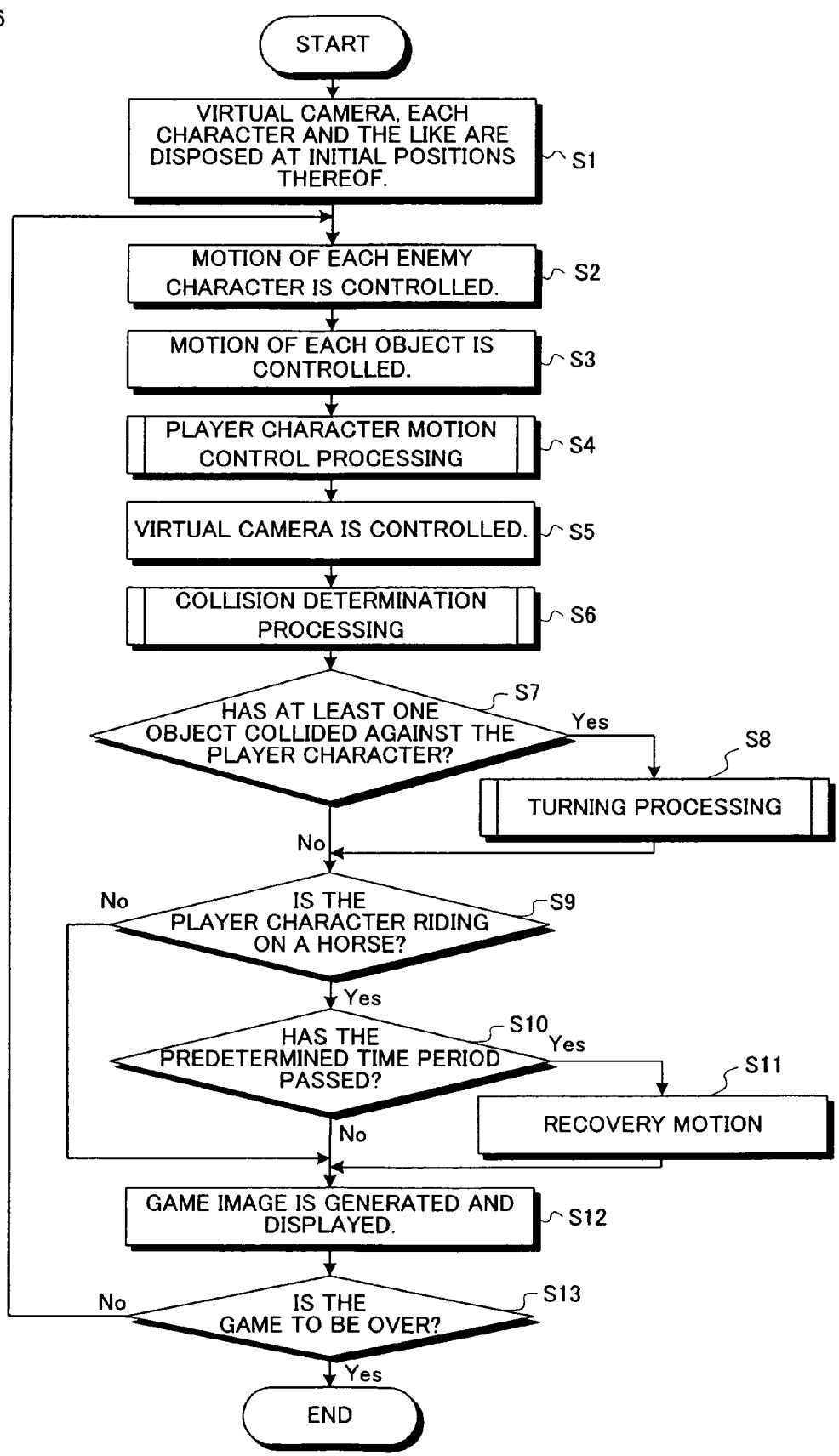
FIG. 16 is a flowchart illustrating a flow of game processing performed by the game apparatus 3.

Next, with reference to FIG. 16 through FIG. 20, the game processing performed by the game apparatus 3 by execution of the game program will be described in detail. FIG. 16 is a flowchart illustrating a flow of the game processing performed by the game apparatus 3. When the game apparatus 3 is turned on, the CPU 31 of the game apparatus 3 executes a start program stored in a boot ROM (not shown) to initialize the elements such as the work memory 32 and the like. Then, the game program stored in the optical disc 4 is read into the work memory 32, and the CPU 31 starts executing the game program. The flowchart shown in FIG. 16 illustrates the game processing executed after such processing is finished.

With reference to FIG. 16, first in step S1, the game space is constructed. The player character, enemy characters and the like are disposed at initial positions thereof. A virtual camera is set at a position for taking an image of the player character and a part of the game space in the vicinity of the player character. An image of the game space seen by the virtual camera is displayed on the TV 2. After step S1, game operations using the controller 6 are accepted, and thus the game proceeds. The processing in step S1 is followed by processing in step S2. The loop of processing in steps S2 through S13 is performed within one frame.

In step S2, the motion of each of the enemy characters is controlled. Namely, the CPU 31 causes each enemy character to perform a motion in accordance with an algorithm predetermined by the game program. Thus, each enemy character moves in the game space or attacks the player character. When an enemy character attacks the player character, an arrow object, a bomb object or the like is newly located in the game space. The processing in step S2 is followed by processing in step S3.

In step S3, the motion of each of the objects located in the game space is controlled. Specifically, regarding an object which moves in the game space (the above-mentioned arrow object), the CPU 31 calculates a velocity vector in accordance with a predetermined algorithm in consideration of the physical laws and the like and thus calculates a position at which the object is to be located in the next frame. At this point, the contents of the object position data 84 and the velocity vector data 85 stored in the work memory 32 are updated to the contents representing the newly calculated position and velocity vector. Regarding an object, the hitting determination area of which is changed (the above-mentioned bomb object), the CPU 31 sets a hitting determination area thereof in the next frame. At this point, the content of the determination area data 86 stored in the work memory 32 is updated to the content representing the newly calculated hitting determination area. The processing in step S3 is followed by processing in step S4.

Figure 17:
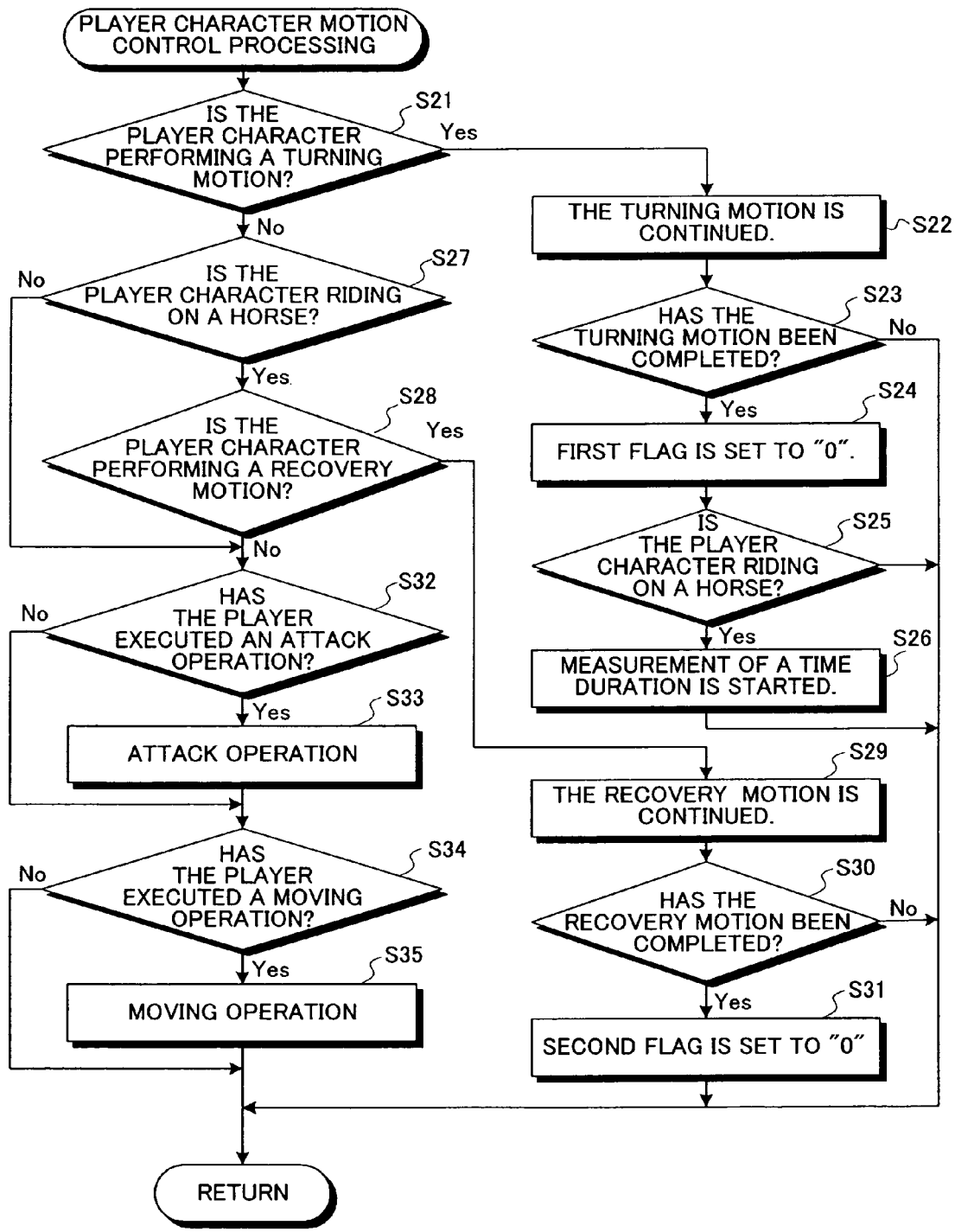
FIG. 17 is a flowchart illustrating a detailed flow of step S4 shown in FIG. 16.

In step S4, processing for controlling the motion of the player character (player character motion control processing) is executed. FIG. 17 is a flowchart illustrating a detailed flow of step 4 (player character motion control processing) shown in FIG. 16. In the player character motion control processing, first in step S21, it is determined whether or not the player character is performing a turning motion. Specifically, when the first flag 88 stored in the work memory 32 is set to "1", it is determined that the player character is performing a turning motion; whereas when the first flag 88 is set to "0", it is determined that the player character is not performing a turning motion. When it is determined in step S21 that the player character is performing a turning motion, processing in step S22 is executed. When it is determined in step S21 that the player character is not performing a turning motion, processing in step S27 is executed.

In step S22, the turning motion is continued. Namely, the CPU 31 causes the player character to perform a part corresponding to one frame out of the turning motion performed over a plurality of frames. As a result of step S22 being repeated over a plurality of frames, a turning motion animation is displayed over a plurality of frames. Next in step S23, it is determined whether or not the turning motion has been completed. Namely, it is determined whether or not the turning motion is completed by the part of the motion performed in step S22 in this cycle of processing. When it is determined that the turning motion has not been completed, the CPU 31 terminates the player character motion control processing. When it is determined that the turning motion has been completed, processing in step S24 is executed.

In step S24, the first flag 88 stored in the work memory 32 is set to "0". Next in step S25, it is determined whether or not the player character is riding on a horse. When it is determined that the player character is not riding on a horse, the CPU 31 terminates the player character motion control processing. When it is determined that the player character is riding on a horse, processing in step S26 is executed. In step S26, a time duration used in step S10 described below is started to be measured. When the processing in step S26 is completed, the CPU 31 terminates the player character motion control processing.

In step S27, it is determined whether or not the player character is riding on a horse. When it is determined that the player character is riding on a horse, processing in step S28 is executed. When it is determined that the player character is not riding on a horse, the processing in step S28 is skipped and processing in step S32 is executed.

In step S28, it is determined whether or not the player character is performing a recovery motion (a motion of returning to the state before the turning motion). Specifically, when the second flag 89 stored in the work memory 32 is set to "1", it is determined that the player character is performing a recovery motion; whereas when the second flag 89 is set to "0", it is determined that the player character is not performing a recovery motion. When it is determined in step S28 that the player character is performing a recovery motion, processing in step S29 is executed. When it is determined in step S28 that the player character is not performing a recovery motion, processing in step S32 is executed.

In step S29, the recovery motion is continued. Namely, the CPU 31 causes the player character to perform a part corresponding to one frame out of the recovery motion performed over a plurality of frames. As a result of step S29 being repeated over a plurality of frames, a recovery motion animation is displayed over a plurality of frames. Next in step S30, it is determined whether or not the recovery motion has been completed. Namely, it is determined whether or not the recovery motion is completed by the part of the motion performed in the step S29 in this cycle of processing. When it is determined that the recovery motion has not been completed, the CPU 31 terminates the player character motion control processing. When it is determined that the recovery motion has been completed, processing in step S31 is executed. In step S31, the second flag 89 stored in the work memory 32 is set to "0". This is performed because the moving direction and the attacking direction of the player character match each other. When the processing in step S31 is completed, the CPU 31 terminates the player character motion control processing.

In step S32, it is determined whether or not the player has executed a game operation of causing the player character to perform an attack (such a game operation will be referred to as an "attack operation"). Specifically, the CPU 31 reads operation data from the controller 6 and determines whether or not a predetermined button for an attack operation has been pressed. When such a button has been pressed, it is determined that an attack operation has been executed, and thus processing in step S33 is executed. When such a button has not been pressed, it is determined that an attack operation has not been executed, and thus the processing in step S33 is skipped and processing in step S34 is executed.

In step S33, the player character is caused to perform an attack motion (a motion of shooting a narrow). The attack motion may be performed over a plurality of frames, like the turning motion. When the player character is attacked by an enemy character while performing the attack motion, the player character may stop the attack motion and perform the turning motion. The processing in step S33 is followed by processing in step S34.

In step S34, it is determined whether or not the player has executed a game operation of moving the player character (such a game operation will be referred to as a "moving operation"). Specifically, the CPU 31 reads operation data from the controller 6 and determines whether or not a predetermined switch for a moving operation (for example, the main stick 61) has been operated. When such a switch has been operated, it is determined that a moving operation has been executed, and thus processing in step S35 is executed. When such a switch has not been operated, it is determined that a moving operation has not been executed, and the CPU 31 terminates the player character motion control processing.

In step S35, the player character is caused to perform a motion of moving in the game space. Specifically, the CPU 31 determines a position and a direction of the player character in the next frame in accordance with the moving operation performed in step S34. In response thereto, the contents of the character position data 80, the moving direction data 81, and the attacking direction data 82 stored in the work memory 32 are updated to the contents representing the newly determined position and direction. When the processing in step S35 is completed, the CPU 31 terminates the player character motion control processing. This is the end of the description of the player character motion control processing.

Returning to FIG. 16, in step S5 after step S4, the virtual camera is controlled. The CPU 31 may determine a position and a direction of the virtual camera based on the position of the player character or in accordance with the operation executed by the player. The processing in step S5 is followed by processing in step S6.

In step S6, collision determination processing is executed. The collision determination processing is executed for determining whether or not the player character and each object have collided against each other. Hereinafter, with reference to FIG. 18, the collision determination processing will be described in detail.

Figure 18:
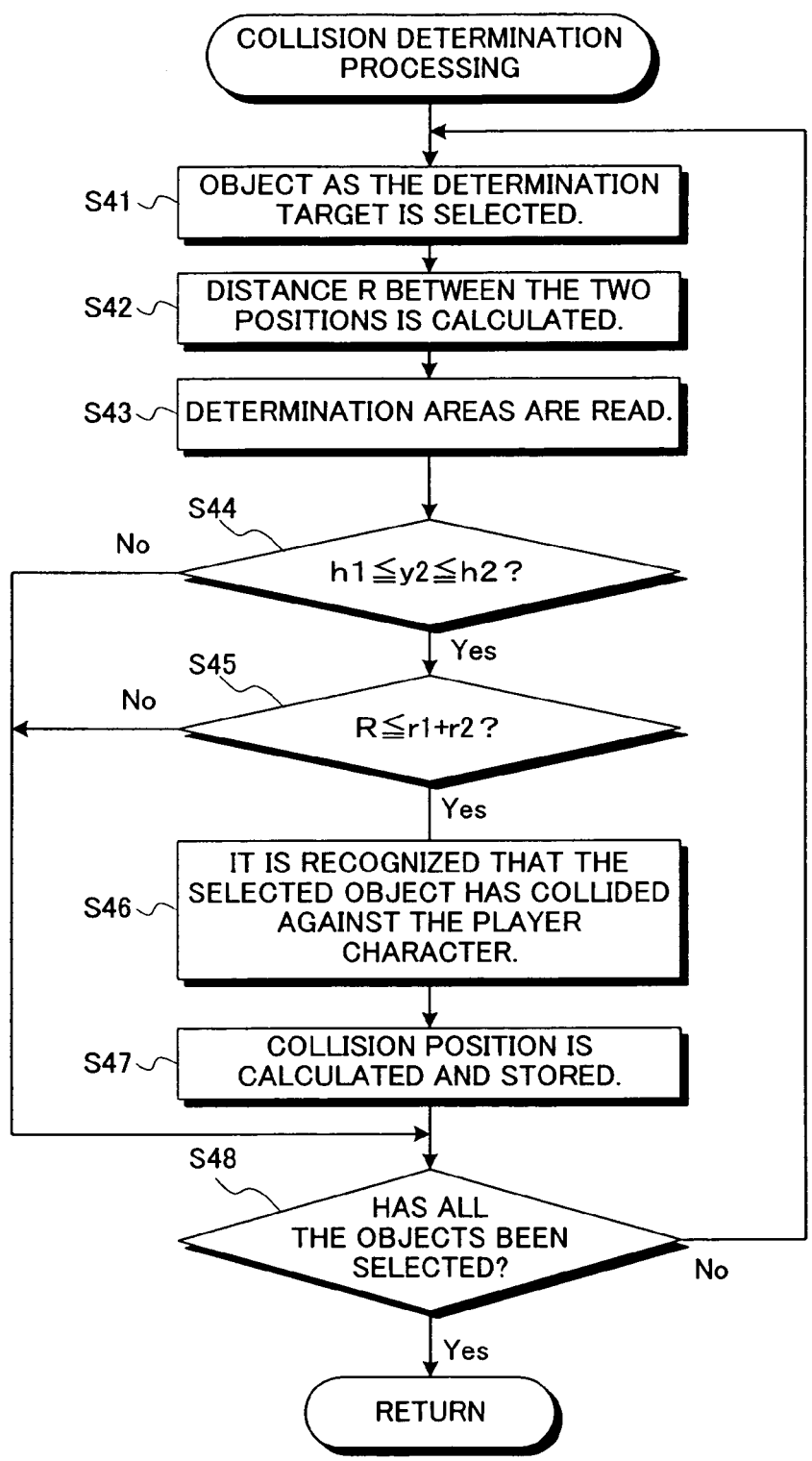
FIG. 18 is a flowchart illustrating a detailed flow of step S6 shown in FIG. 16.

FIG. 18 is a flowchart illustrating a detailed flow of step 6 (collision determination processing) shown in FIG. 16. In the collision determination processing, first in step S41, one object is selected as a determination target of the collision determination processing out of the objects appearing in the game space. In step S41, an object which has not been selected in the loop of processing in steps S41 through S48 is selected. In the following description of the collision determination processing, an object selected in step S41 will be referred to as a "selected object".

Figure 19:
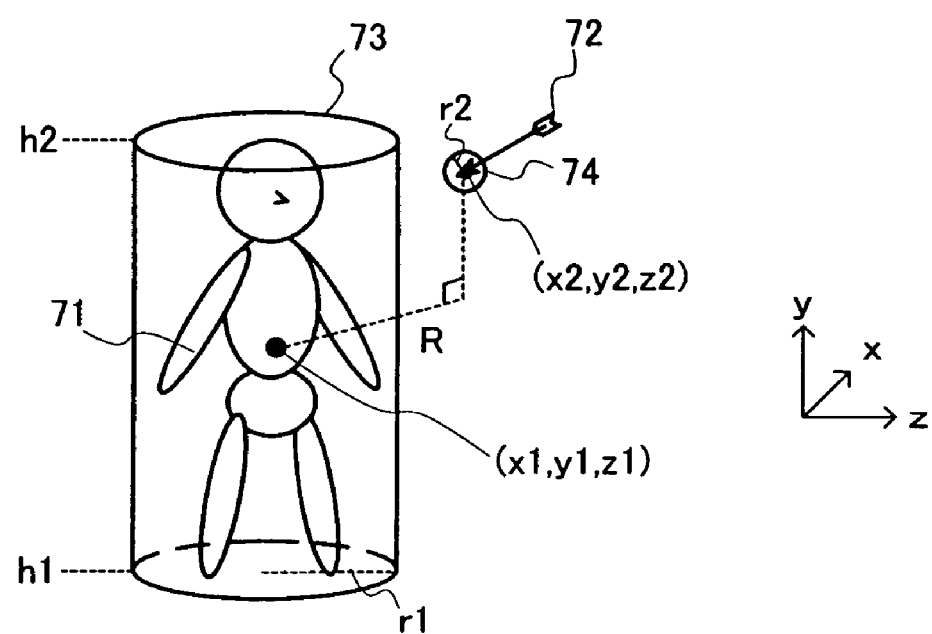
FIG. 19 shows processing in steps S42 through S45 shown in FIG. 18.

FIG. 19 illustrates the processing in steps S42 through S45 shown in FIG. 18. In FIG. 19, the coordinate position of the player character 71 is (x1, y1, z1) and the coordinate position of the selected object (arrow object) 72 is (x2, y2, z2). The radius of the bottom surface of the cylindrical area as the hitting determination area 73 for the player character 71 is r1, and the y-axis coordinates of the bottom surface and the top surface of the cylinder are h1 and h2. The radius of the spherical area as the hitting determination area 74 for the selected object 72 is r2. Hereinafter, the processing in step S42 through S45 will be described.

In step S42, distance R on the x-z plane between the player character 71 and the selected object 72 is calculated. Distance R is calculated using the character position data 80 and the object position data 84 stored in the work memory 32. Distance R is the size of an x-z component of a vector connecting the position of the player character 71 and the position of the selected object 72. Namely, distance $R=((x1-x2)^2)+(z1-z2)^2)^{1/2}$. Next in step S43, the determination area data 83 representing the hitting determination area 73 of the player character 71 and the determination area data 86 representing the hitting determination area 74 of the selected object 72 are read from the work memory 32.

Next in steps S44 and S45, it is determined whether or not the player character 71 and the selected object 72 are in contact with each other. First in step S44, it is determined whether or not the selected object 72 is located at the same height (position on the y axis) as the player character 71. Specifically, the CPU 31 determines whether or not position y2 of the selected object 72 on the y axis fulfills $h1 \leq y2 \leq h2$. Position y2 is obtained by referring to the object position data 84 stored in the work memory 32, and h1 and h2 are obtained from the character position data 80 and the determination area data 83 stored in the work memory 32. When position y2 fulfills $h1 \leq y2 \leq h2$, it is determined that the selected object 72 is located at the same height as the player character 71, and the processing in step S45 is executed. When position y2 does not fulfill $h1 \leq y2 \leq h2$, it is determined that the selected object 72 is not located at the same height as the player character 71 (i.e., the collision has not occurred), and processing in step S48 is executed.

In step S45, it is determined whether or not the selected object 72 has collided against the player character 71 with respect to the x-z plane. Specifically, the CPU 31 determines whether or not distance R calculated in step S42 fulfills $R \leq r1+r2$. When distance R fulfills $R \leq r1+r2$, it is determined that the selected object 72 has collided against the player character 71, and processing in step S46 is executed. When distance R does not fulfill $R \leq r1+r2$, it is determined that the selected object 72 has not collided against the player character 71, and the processing in steps S46 and S47 is skipped and processing in step S48 is executed.

In step S46, it is recognized that the selected object 72 has collided against the player character 71. Specifically, the collision flag 87 of the object data representing the selected data 72 is set to "1". Next in step S47, the collision position is calculated. Specifically, the collision position is a position at which the hitting determination area 73 for the player character 71 and the hitting determination area 74 for the selected object 72 contact each other. Data on the calculated collision position is stored in the work memory 32 as the collision position data 90. The processing in step S47 is followed by processing in step S48.

In step S48, it is determined whether or not all the objects appearing in the game space have been selected in step S41. When there is still at least one object which has not been selected in step S41, the processing in step S41 is executed. Until all the objects are selected in step S41, the processing in steps S41 through S48 is repeated. When all the objects are selected in step S41, the CPU 31 terminates the collision determination processing. This is the end of the description of the collision determination processing.

Returning to FIG. 16, in step S7 after step S6, it is determined whether or not there is at least one object which has collided against the player character. Specifically, it is determined whether or not there is at least one object for which the collision flag 87 is set to "1" in the collision determination processing in step S6. When it is determined that there is at least one object which has collided against the player character, processing in step S8 is executed. When it is determined that there is no object which has collided against the player character, the processing in step S8 is skipped and processing in step 9 is executed.

In step S8, the turning processing is executed. The turning processing is executed for causing the player character to perform a turning motion. Hereinafter, with reference to FIG. 20, the turning processing will be described in detail.

FIG. 20 is a flowchart illustrating a detailed flow of step 8 (turning processing). In the turning processing, first in step S51, an object which was determined to have collided against the player character in the collision determination processing is selected out of the objects appearing in the game space. Namely, an object for which the collision flag 87 stored in the work memory 32 is set to "1" is selected. The processing in step S51 is followed by processing in step S52.

In step S52, it is determined whether or not the size of the velocity vector of the object selected in step S51 is zero. The processing is step S52 is executed for determining whether the object selected in step S51 is a moving object such as the arrow object or an area deforming object such as the bomb object. The determination in step S52 is specifically performed based on the direction data represented by the velocity vector data 85 stored in the work memory 32 regarding the object selected in step S51. When it is determined in step S52 that the size of the velocity vector of the object selected in step S51 is zero, processing in step S54 is executed. When it is determined in step S52 that the size of the velocity vector of the object selected in step S51 is not zero, processing in step S53 is executed. For an area deforming object which does not move in the game space, there is no need to set a velocity vector. In such a case, the CPU 31 determines that the size of the velocity vector is zero.

In step S53, a vector starting at the contact position and terminating at the position of the player character is calculated. The contact position is already calculated in step S47. The position of the player character is obtained based on the character position data 80 stored in the work memory 32. In step S54, a velocity vector of the object selected in step S51 is read from the work memory 32. In the following description given with reference to FIG. 20, the vector obtained in step S53 or S54 will be referred to as a "velocity vector". The processing in step S53 or S54 is followed by processing in step S55.

In step S55, the first direction to which the player character is to turn is calculated based on the velocity vector. Specifically, the first direction is represented by a two-dimensional vector having an x component and a z component of the velocity vector. More specifically, where the velocity vector is (Δx, Δy, Δz), the angle θh(°) representing the first direction is calculated in accordance with the following expression set (1).

When $\Delta z > 0$, $\theta h = \tan^{-1}(\Delta x/\Delta z)$;

When $\Delta z < 0$, $\theta h = 180 + \tan^{-1}(\Delta x/\Delta z)$;

When $\Delta z = 0$ and $\Delta x > 0$, $\theta h = 90$; and

When $\Delta z = 0$ and $\Delta x < 0$, $\theta h = 270$ (1)

Here, θh is an angle obtained where the first reference direction as the reference (0°) is a positive direction on the z axis. The processing in step S55 is followed by processing in step S56.

In step S56, the second direction to which the player character is to turn is calculated based on the velocity vector. Specifically, the second direction is represented by a two-dimensional vector having a y component of the velocity vector and a component of the velocity vector regarding the first direction. More specifically, where the velocity vector is (Δx, Δy, Δz), the angle θv(°) representing the second direction is calculated in accordance with the following expression set (2).

When $L > 0$, $\theta v = \tan^{-1}(\Delta y/\Delta L)$;

When $L < 0$, $\theta v = 180 + \tan^{-1}(\Delta y/\Delta L)$;

When $L = 0$ and $\Delta y > 0$, $\theta v = 90$; and

When $L = 0$ and $\Delta y < 0$, $\theta v = 270$ (2)

Here, ΔL is a component of the velocity vector regarding the first direction; namely, $\Delta L = ((\Delta x)^2 + (\Delta z)^2)^{1/2}$. θv is an angle obtained where the second reference direction as the reference (0°) is the first direction. The processing in step S56 is followed by processing in step S57.

In step S57, it is determined whether or not the second direction calculated in step S56 has a value within the predetermined motion range. Specifically, it is determined whether or not the angle θv calculated in step S56 fulfills the condition of $-\theta a \leq \theta v \leq \theta a$. When this condition is fulfilled, processing in step S58 is skipped and processing in step S59 is executed. When this condition is not fulfilled, processing in step S58 is executed.

In step S58, the second direction calculated in step S56 is corrected so as to have a value within the motion range. Specifically, when the angle θv calculated in step S56 is θv<−θa, θv is corrected to −θa; where when the angle θv is θv>θa, θv is corrected to θa. Such a correction can prevent the head of the player character from turning to an unnatural direction. The processing in step S58 is followed by processing in step S59.

In other embodiments, the first direction may also be subjected to the processing as in steps S57 and S58. Namely, when a motion range as described above is set for the first direction and the angle θh has a value outside the motion range, the angle θh may be corrected to have a value within the motion range. Especially when the player character is riding on a horse, it is preferable to set a motion range also for the first direction.

In step S59, it is determined whether or not the player character is riding on a horse. When it is determined that the player character is riding on a horse, processing in steps S61 and S62 is executed. When it is determined that the player character is not riding on a horse (i.e., that the player character is standing), processing in step S60 is executed.

In step S60, a motion of turning the entire body of the player character (turning motion) is performed. The turning motion performed in step S60 is provided by the entire body of the player character. Namely, the player character turns its entire body to the first direction and turns its head to the second direction. At this point, the CPU 31 updates the content of the moving direction data 81 stored in the work memory 32 to data representing the first direction (angle θh) calculated in step S55. The CPU 31 also updates the content of the attacking direction data 82 stored in the work memory 32 to data representing the first direction (angle θh), like the moving direction data 81. As described above, the turning motion started in step S60 is performed over a plurality of frames. The processing in step S60 is followed by processing in step S63.

In step S61, a motion of turning the upper half of the body of the player character (turning motion) is performed. The turning motion performed in step S61 is provided by the upper half of the body of the player character. Namely, the player character turns the upper half of its body to the first direction and turns its head to the second direction. At this point, the CPU 31 updates the content of the attacking direction data 82 stored in the work memory 32 to data representing the first direction (angle θh) calculated in step S55. The content of the moving direction data 81 stored in the work memory 32 is not updated because the direction of the lower half of the body of the player character (the direction of the horse on which the player character is riding) is not changed. In other embodiments, the turning motion started in step S61 is performed over a plurality of frames. Next in step S62, the second flag 89 stored in the work memory 32 is set to "1" because the moving direction is made different from the attacking direction as a result of the processing in step S61. The processing in step S62 is followed by processing in step S63.

In this embodiment, in step S60, the contents of the moving direction data 81 and the attacking direction data 82 are updated to the data representing the first direction. Alternatively, the contents of the moving direction data 81 and the attacking direction data 82 may be gradually changed in accordance with the turning motion which is performed over a plurality of frames. Similarly, in step S61, the content of the attacking direction data 82 may be gradually changed in accordance with the turning motion which is performed over a plurality of frames.

In step S63, the first flag 88 stored in the work memory 32 is set to "1" because the turning motion is started in step S60 or S61. Next in step S64, the collision flag 87 set for the object selected in step S51 is set to "0". When the processing in step S64 is completed, the CPU 31 terminates the turning processing. This is the end of the description of the turning processing.

Returning to FIG. 16, when it is determined in step S7 that no object has collided against the player character, or after the turning motion in step S8 is completed, processing in step 9 is executed. In step S9, it is determined whether or not the player character is riding on a horse. When it is determined that the player character is not riding on a horse, processing in step S12 is executed. When it is determined that the player character is riding on a horse, processing in step S10 is executed.

In step S10, it is determined whether or not a predetermined time period has passed after the player character riding on the horse performed the turning motion. Specifically, the CPU 31 determines whether or not the time duration which started to be measured in step S26 has exceeded the predetermined time period. The processing in step S10 is executed for determining whether or not a recovery motion is to be started. When it is determined in step S1 that the predetermined time period has passed, processing in step S11 is executed. When it is determined in step S10 that the predetermined time period has not passed, processing in step S12 is executed.

In step S11, the player character performs a recovery motion. Namely, the player character, which has turned the upper half of its body to the first direction and its head to the second direction, performs a motion of turning the upper half of its body to the moving direction and turning its head to the second reference direction. At this point, the CPU 31 updates the content of the attacking direction data 82 stored in the work memory 32 to the content of the moving direction data 81. As described above, the recovery motion started in step S11 is performed over a plurality of frames. The processing in step S11 is followed by processing in step S12.

In step S12, the CPU 31 generates a game image of the game space taken by the virtual camera based on the motions of each character and each object determined in steps S2 through S11. The CPU 31 then displays the generated game image on the TV 2. Next in step S13, it is determined whether or not the game is to be over. The determination in step S13 is performed based on, for example, whether or not the stamina of the player character has become zero, or whether or not the player character has defeated all the enemy characters. When it is determined in step S13 that the game is to be over, the CPU 31 terminates the game processing shown in FIG. 16. When it is determined in step S13 that the game is not to be over, the processing in step S2 is executed. Until it is determined in step S13 that the game is to be over, the series of processing in steps S2 through S13 is repeated. This is the end of the detailed description of the game processing.

As described above, according to this embodiment, the player character is caused to perform a turning motion, so that the motion of the player character when the object and the player character collide against each other can be represented realistically. The direction of the turning motion is determined based on the direction data of the moving object. Therefore, the player character can perform a turning motion to a natural direction. According to this embodiment, when an object for which no velocity vector is calculated (area deforming object) and the player character collide against each other, the direction of the turning motion is determined based on the collision position. Therefore, even when no velocity vector is calculated, the direction of the turning motion can be easily calculated.

In the above embodiment, the player character performs the turning motion. The turning motion may be performed by an enemy character instead of the player character. The present invention is not limited to being used for a game, and is applicable to any case where any character appearing in a virtual space performs a turning motion.

In the above embodiment, the turning motion is a combination of a rotation motion (first rotation motion) performed around an axis (y axis) perpendicular to the ground in a virtual three-dimensional space and a rotation motion (second rotation motion) performed around an axis parallel to the ground (first direction). In other embodiments, the turning motion may include only the first rotation motion. Namely, the player character may perform, as the turning motion, only a rotation motion around the axis perpendicular to the ground in a virtual three-dimensional space. In this case, it is not necessary to calculate the second direction, and the processing load of the game apparatus 3 for the turning motion can be alleviated.

In the above embodiment, hitting determination areas are used to determine whether or not the player character and the object have collided against each other. Namely, the game apparatus 3 easily performs the processing of determining whether or not a collision has occurred by using hitting determination areas having different shapes from that of the player character (or the object). In the case where the processing capability of the game apparatus 3 is insufficient, it may be determined whether or not the collision has occurred by directly determining whether or not the player character and the object are in contact with each other. In other words, a hitting determination area having the same shape as that of the object may be set (i.e., the area of the object may be used as the hitting determination area), instead of setting a hitting determination area having a different shape from that of the object. This allows the determination on the collision to be performed more accurately.

As described above, the disclosed game systems are usable for an image processing program and an image processing apparatus for, for example, realistically representing motions of objects when the objects collide against each other.

While the invention has been described in detail, the foregoing description is in all aspects illustrative and not restrictive. It is understood that numerous other modifications and variations can be devised without departing from the scope of the invention.

What is claimed is:

1. A computer-readable storage medium having an image processing program stored therein to be executed by a computer of an image processing apparatus for causing a display apparatus to display a three-dimensional virtual space in which a plurality of objects appear, wherein the image processing program causes the computer to perform:
   a first moving control operation to move a first object in the virtual space;
   a determination operation to determine whether or not the first object has collided against a second object;
   a direction calculation operation which, when it is determined in the determination operation that the first object has collided against the second object, calculates a moving direction of the first object, wherein the direction calculation operation is performed in conjunction with the determination in the determination operation that the first object has collided against the second object and the calculated moving direction represents a direction of movement by the first object prior to the collision;
   a first motion control operation to cause the second object to perform a motion such that at least a part of the second object turns to a designated direction, which is an opposite direction to the moving direction of the first object, wherein the first motion control operation is performed after the direction calculation operation; and
   a display operation to cause the display apparatus to display how the second object is caused to perform the motion by the first motion control operation.

2. A storage medium according to claim 1, wherein:
   the second object performs a motion which is different from a moving motion in response to the fulfillment of a first condition;
   in the first motion control operation, the part of the second object is controlled to turn to the designated direction; and
   the image processing program causes the computer to further execute a second motion control operation to cause the second object to perform the predetermined motion to the designated direction in accordance with the first condition being fulfilled.

3. A storage medium according to claim 2, wherein:
   the second object is an operation target object operable by a user;
   the first condition is that the user has performed an operation on the second object; and
   in the first motion control operation, the motion of the second object is performed regardless of an operation performed by the user.

4. A storage medium according to claim 2, wherein the image processing program causes the computer to further execute a second moving control operation which, when the part of the second object turns to the designated direction, moves the second object in the designated direction to which the remaining part of the second object is directed.

5. A storage medium according to claim 1, wherein:
   in the first motion control operation, the part of the second object is controlled to turn to the designated direction; and
   the image processing program causes the computer to further perform a third motion control operation that, after the part of the second object turns to the designated direction, causes the second object to return the part of the second object to an original direction in accordance with a second condition being fulfilled.

6. A storage medium according to claim 1, wherein in the determination operation, it is determined whether or not the first object has collided against the second object based on whether or not a hitting determination area set for the first object is in contact with a hitting determination area set for the second object.

7. A storage medium according to claim 1, wherein:
   in the direction calculation operation, a two-dimensional vector representing a component parallel to a plane in the virtual space is calculated for a vector representing the moving direction of the first object; and
   in the first motion control operation, the second object performs a rotation motion around an axis perpendicular to the predetermined plane, with the designated direction is an opposite direction to the two-dimensional vector calculated in the direction calculation operation.

8. A computer-readable storage medium having an image processing program stored therein to be executed by a computer of an image processing apparatus for causing a display apparatus to display a three-dimensional virtual space in which a plurality of objects appear, wherein the image processing program causes the computer to execute:
   a velocity vector storage operation to store a velocity vector representing a moving direction and a moving distance per time unit of a first object in the virtual space;
   a first moving control operation to move a position of the first object in the virtual space based on the velocity vector;
   a determination operation to determine whether or not the first object has collided against a second object;
   a velocity vector referring operation that, when it is determined in the determination operation that the first object has collided against the second object, refers to the velocity vector of the first object, wherein the velocity vector referring operation is performed in conjunction with the determination in the determination operation that the first object has collided against the second object;
   a first motion control operation that causes the second object to perform a motion such that at least a part of the second object turns to a designated direction, which is an opposite direction to the velocity vector, wherein the first motion control operation is performed after the velocity vector referring operation and the velocity vector refers to the movement of the first object before the collision; and a display operation that causes the display apparatus to display how the second object is caused to perform the motion by the first motion control step.

9. A storage medium according to claim 8, wherein:
the second object performs a predetermined motion which is different from a moving motion when a first condition is fulfilled;
in the first motion control operation, the part of the second object is controlled to turn to the designated direction; and
the image processing program causes the computer to further execute a second motion control operation to cause the second object to perform the predetermined motion to the designated direction in accordance with the first condition being fulfilled.

10. A storage medium according to claim 9, wherein:
the second object is an operation target object operable by a user;
the first condition is that the user has performed an operation on the second object; and
in the first motion control operation, the motion of the second object is performed regardless of an operation performed by the user.

11. A storage medium according to claim 9, wherein the image processing program causes the computer to further execute a second moving control operation that, when the part of the second object turns to the designated direction, moves the second object in a direction to which the remaining part of the second object is directed.

12. A storage medium according to claim 8, wherein:
in the first motion control operation, the part of the second object is controlled to turn to the designated direction; and
the image processing program causes the computer to further execute a third motion control operation that, after the part of the second object turns to the designated direction, causing the second object to return the part of the second object to an original direction in accordance with a second condition being fulfilled.

13. A computer-readable storage medium having an image processing program stored therein to be executed by a computer of an image processing apparatus for causing a display apparatus to display a three-dimensional virtual space in which a plurality of objects appear, wherein the image processing program causes the computer to perform:
a deformation operation to deform a hitting determination area set for a first object;
a determination operation to determine whether or not the hitting determination area set for the first object is in contact with a hitting determination area set for a second object;
a position calculation operation that, when it is determined in the determination operation that the hitting determination area set for the first object is in contact with the hitting determination area set for the second object, calculates a contact position of the hitting determination areas, wherein the position calculation operation is performed in conjunction with the determination operation of the contact between the hitting determination area set for the first object and the hitting determination area set for the second object;

a first motion control operation to cause the second object to perform a motion such that at least a part of the second object turns to a designated direction, wherein the designated direction is opposition to a direction from a position of the first object prior to the determination of contact between the hitting areas to the contact position, wherein the first motion control operation is performed after the contact position is calculated in the position calculation operation; and display via the display apparatus to display how the second object is caused to perform the motion by the first motion control step.

14. A storage medium according to claim 13, wherein:
the second object performs a predetermined motion which is different from a moving motion when a first condition is fulfilled;
in the first motion control operation, the part of the second object is controlled to turn to the designated direction; and
the image processing program causes the computer to further execute a second motion control operation to cause the second object to perform the predetermined motion to the designated direction in accordance with the first condition being fulfilled.

15. A storage medium according to claim 14, wherein:
the second object is an operation target object operable by a user;
the first condition is that the user has performed an operation on the second object; and
in the first motion control operation, the motion of the second object is performed regardless of an operation performed by the user.

16. A storage medium according to claim 14, wherein the image processing program causes the computer to further execute a second moving control operation, when the part of the second object turns to the designated direction, to move the second object in a direction to which the remaining part of the second object is directed.

17. A storage medium according to claim 13, wherein:
in the first motion control operation, the part of the second object is controlled to turn to the designated direction; and
the image processing program causes the computer to further execute a third motion control operation that, after the part of the second object turns to the designated direction, causes the second object to return the part of the second object to an original direction in accordance with a predetermined second condition being fulfilled.

18. A storage medium according to claim 13, wherein:
in the first motion control operation, a two-dimensional vector representing a component parallel to a plane in the virtual space is calculated for a vector representing a direction from the contact position to a position of the second object; and
the second object performs a rotation motion around an axis perpendicular to the plane, with the designated direction being an opposite direction to the two-dimensional vector.

19. An image processing apparatus for causing a display apparatus to display a three-dimensional virtual space in which a plurality of objects appear, the image processing apparatus comprising:
first moving control logic unit which moves a first object in the virtual space;
determination logic unit which determines whether or not the first object has collided against a second object;

direction calculation logic unit which, when it is determined by the determination logic unit that the first object has collided against the second object, calculates a moving direction of the first object, wherein the calculation of the moving direction of the first object by the direction calculation logic unit is performed in conjunction with the determination in the determination logic unit that the first object collided against the second object and the moving direction corresponds to a movement of the first object before the collision;

first motion control logic unit that causes the second object to perform a motion such that at least a part of the second object turns towards an opposite direction to the moving direction of the first object, wherein the at least a part of the second object turning by the first motion control logic unit occurs after the calculation of the moving direction of the first object by the direction calculation logic unit; and a display control logic unit causing the display apparatus to display the second object performing the motion caused by the first motion control logic unit.

20. An image processing apparatus for causing a display apparatus to display a three-dimensional virtual space in which a plurality of objects appear, the image processing apparatus comprising:

velocity vector storage logic unit that stores a velocity vector representing a moving direction and a moving distance per time unit of a first object in the virtual space before the first object collides with a second object;

first moving control logic unit that updates a position of the first object in the virtual space based on the velocity vector to move the first object;

a determination logic unit that determines whether or not the first object has collided against the second object;

velocity vector referring logic unit that, when it is determined by the determination logic unit that the first object has collided against the second object, refers to the velocity vector of the first object, wherein the referring to the velocity vector of the first object by the velocity vector referring logic unit is performed in conjunction with the determination that the first object collided against the second object by the determination logic unit;

first motion control logic unit that causes the second object to perform a motion such that at least a part of the second object turns to a designated direction, which is an opposite direction to the velocity vector, wherein the second object turns to the designated direction by first motion control logic unit after referring to the velocity vector of the first object by the velocity vector referring logic unit; and a display control logic unit that causes the display apparatus to display the second object performing the motion caused by the first motion control logic unit.

21. An image processing apparatus for causing a display apparatus to display a three-dimensional virtual space in which a plurality of objects appear, the image processing apparatus comprising:

a deformation logic unit that deforms a hitting determination area set for a first object;

a determination logic unit that determines whether or not the hitting determination area set for the first object is in contact with a hitting determination area set for a second object;

a position calculation logic unit, when it is determined by the determination logic unit that the hitting determination area set for the first object is in contact with the hitting determination area set for the second object, calculates a contact position of the hitting determination areas, wherein the calculation of the contact position by the position calculation logic unit is performed in conjunction with the determination that the hitting determination area set for the first object is in contact with the hitting determination area set for the second object by the determination logic unit;

a first motion control logic unit causing the second object to perform a motion such that at least a part of the second object turns to a designated direction, wherein the designated direction is opposition to a direction from a pre-collision position of the first object to the contact position, and wherein the second object turns to the designated direction by the first motion control logic unit after the calculation of the contact position by the position calculation logic unit; and a display control logic unit causing the display apparatus to display the second object performing the motion caused by the first motion control logic unit.

22. A system including a processor, a display device, and a non-transient storage medium having an image processing program executed by the processor to generate images shown on the display device apparatus to display images of a three-dimensional virtual space in which a plurality of objects appear, wherein the image processing program causes the processor to:

move a first object in the virtual space having a second object;

determine whether a collision has occurred between the first object and the second object;

calculate a pre-collision moving direction of the first object in conjunction with the determination of the collision;

turn at least a portion of the second object towards a direction opposite to the pre-collision moving direction of the first object after the calculation of the moving direction, and display by the display device an image showing the turning of the second object.

23. A method to display objects on a display comprising:

calculating a movement direction in which a first object is moving and a position of the first object;

determining if the first object has collided with or is to collide with a second object based on the calculated movement direction prior to the collision and a current position of the first object, and a current position of the second object;

turning at least a part of the second object towards an opposite direction to the calculated movement direction of the first object, and displaying the turning of the at least a part of the second object.

24. A computer-readable storage medium having an image processing program stored therein to be executed by a computer of an image processing apparatus to generate images of a three-dimensional virtual space in which a plurality of virtual objects appear, wherein the image processing program causes the computer to:

deform a first hitting determination area set in the virtual space for a first virtual object;

detect a contact position corresponding to an intersection of the deformed hitting determination area set for the first object and a second hitting determination area set in the virtual space for a second virtual object;

in response to the determination of the contact position, turn at least a portion of the second object towards a direction opposite to a direction from a position of the first object prior to the detection of the contact position to the contact position, and the turning is in response to the detection of the contact position, and display the turning of the at least a portion of the second object.

25. A method to display at least one object on a display, wherein the at least one object is a virtual object generated is in a three-dimensional virtual space which are generated by an image processing apparatus, wherein the method comprises:

expanding a first hitting determination area in the virtual space for a first virtual object;

determining a contact position between the expanding first hitting determination area and a second hitting determination area in the virtual space for a second virtual object, wherein the contact position corresponds to an intersection between the first hitting determination area and the second hitting determination area;

turning at least a portion of the second object towards a direction opposition to a direction from the first virtual object prior to the determination of the contact position and the contact position wherein the turning is in response to the determination of the contact position, and display the turning of the at least a portion of the second object.

26. A method to display at least one object on a display, wherein the at least one object is a virtual object generated is in a three-dimensional virtual space which are generated by an image processing apparatus, wherein the method comprises:

moving a first object in the three-dimensional virtual space and determining a pre-collision movement direction of the first object;

detecting a collision between the virtual object and a second object in the three-dimensional virtual space;

aligning at least a part of the second object with an opposite direction to the pre-collision movement direction of the first object, in response to the detection of the collision, and displaying the second object to show the alignment between the at least a part of the second object and the opposite direction to the pre-collision movement direction.

* * * * *